United States Patent
Kashino et al.

(10) Patent No.: US 12,102,875 B2
(45) Date of Patent: Oct. 1, 2024

(54) PERFORMANCE EVALUATION APPARATUS, DATA ACQUISITION APPARATUS, METHODS THEREFOR, AND PROGRAM

(71) Applicant: NIPPON TELEGRAPH AND TELEPHONE CORPORATION, Tokyo (JP)

(72) Inventors: Makio Kashino, Kanagawa (JP); Naoki Saijo, Kanagawa (JP); Toshitaka Kimura, Kanagawa (JP); Daiki Nasu, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 900 days.

(21) Appl. No.: 17/048,056

(22) PCT Filed: Mar. 20, 2019

(86) PCT No.: PCT/JP2019/011835
§ 371 (c)(1),
(2) Date: Oct. 15, 2020

(87) PCT Pub. No.: WO2019/202903
PCT Pub. Date: Oct. 24, 2019

(65) Prior Publication Data
US 2021/0213328 A1    Jul. 15, 2021

(30) Foreign Application Priority Data

Apr. 17, 2018    (JP) .................................. 2018-079305

(51) Int. Cl.
*A63B 69/00*    (2006.01)
*A63B 24/00*    (2006.01)

(52) U.S. Cl.
CPC ...... *A63B 24/0062* (2013.01); *A63B 24/0006* (2013.01); *A63B 69/0002* (2013.01); *A63B 2024/0009* (2013.01); *A63B 2024/0068* (2013.01); *A63B 2069/0008* (2013.01)

(58) Field of Classification Search
None
See application file for complete search history.

(56) References Cited

FOREIGN PATENT DOCUMENTS

| JP | 2017-148446 A | 8/2017 |
|----|---------------|--------|
| JP | 6283776 B1    | 2/2018 |

(Continued)

OTHER PUBLICATIONS

"Dengeki PlayStation vol. 24, No. 5", pp. 106-109, [p. 107, col. "VR mode," Kadokawa Corporation, Feb. 27, 2018_with an English translation generated by computer.

(Continued)

*Primary Examiner* — Damon J Pierce

(57) ABSTRACT

The motion performance of an animal that makes a motion in response to the movement of at least one moving body other than the animal, which is a subject for evaluation, is properly evaluated. The motion data of the animal is acquired by manipulating the difficulty factor of the motion which is made by the animal in response to the movement of the moving body, and the motion performance of the animal is evaluated based on the motion data of the animal. It is to be noted that the motion data contains information indicating the timing of the motion of the animal.

9 Claims, 7 Drawing Sheets

(56) References Cited

FOREIGN PATENT DOCUMENTS

| WO | WO 2017/145996 | 8/2017 |
|---|---|---|
| WO | WO 2018/030424 | 2/2018 |

OTHER PUBLICATIONS

Takagi et al. (2010) "The kinematic characteristics of swing motion to the different speed balls randomly thrown in baseball batting," Journal of the Society of Biomechanisms vol. 34, No. 1, pp. 53-62, with an English translation generated by computer.

Nakamoto et al. (2008) "The relationship of baseball expertise with movement correction to unexpected velocity change in a coincident timing task," Japan Journal of Physical Education, Health and Sport Sciences vol. 53, No. 1, pp. 39-50, with an English translation generated by computer.

Muraskin et al. (2015) "Knowing when not to swing: EEG evidence that enhanced perception-action coupling underlies baseball batter expertise," NeuroImage 123, pp. 1-10.

Nasu et al. (2017) "Cortical Planning and Execution: Reach and Grasp Neurophysiology," Neuroscience, Oct. 18, 2017.

Nasu et al. (2017) "Perception-action linkage in top athletes during batting," Society for Neuroscience Annual Meeting, Nov. 14, 2017.

Kimura et al. (2017) "Virtual reality system to eliminate brain processing in an expert batter," IEICE Technical Report vol. 117 No. 375, pp. 31-34, Dec. 18, 2017 with its English translation generated by computer.

NASU (2018) "Baseball batting analysis shows excellent timing adjustment of batters," NTT Technical Journal vol. 30 No. 1, pp. 18-21, Jan. 1, 2018 with its English translation generated by computer.

Kimura et al. (2018) "Utilizing Virtual Reality to Understand Athletic Performance and Underlying Sensorimotor Processing," ISEA, Feb. 12, 2018.

Kobayashi et al. (2018) "Detecting and Sonifying Temporal Patterns of Body Segments When Batting," ISEA, Feb. 14, 2018.

NASU (2018) "Timing Adjustment of Baseball Batters Determined from Motion Analysis of Batting," NTT Technical Review, vol. 16 No. 3, Mar. 1, 2018.

Isogawa et al. (2018) "What Can VR Systems Tell Sports Players? Reaction-Based Analysis of Baseball Batters in Virtual and Real Worlds," IEEE Conference on Virtual Reality and 3D User Interfaces (VR), Mar. 18, 2018.

Isogawa et al. (2018) "What Can VR Systems Tell Sports Players? Reaction-Based Analysis of Baseball Batters in Virtual and Real Worlds," IEEE Xplore Digital Library, Aug. 30, 2018.

PERFORMANCE EVALUATION APPARATUS, DATA ACQUISITION APPARATUS, METHODS THEREFOR, AND PROGRAM

CROSS-REFERENCE TO RELATED APPLICATIONS

This application is a U.S. 371 Application of International Patent Application No. PCT/JP2019/011835, filed on 20 Mar. 2019, which application claims priority to and the benefit of JP Application No. 2018-079305, filed on 17 Apr. 2018, the disclosures of which are hereby incorporated herein by reference in their entireties.

TECHNICAL FIELD

The present invention relates to a technique of evaluating motion performance.

BACKGROUND ART

In baseball batting, a person has to determine the pitch type of a ball, which is moving toward him/her at high speed, in a short time, judge what type of motion he/she should make in response thereto, and accurately make an intended motion. As a method for evaluating the motion performance of an object person (a batter) in such a motion, a method of Non-patent Literature 1 is known. In this literature, it has been shown that, when images of a ball are displayed on a screen and baseball experienced player and beginner are made to perform the task of judging whether or not he/she should hit the ball and pressing a button if the ball is a ball which he/she should hit, the percentage of correct presses on the button performed by the baseball experienced player is higher than the percentage of correct presses on the button performed by the baseball beginner.

PRIOR ART LITERATURE

Non-Patent Literature

Non-patent Literature 1: Muraskin, J., Sherwin, J., & Sajda, P. (2015).
Knowing when not to swing: EEG evidence that enhanced perception-action coupling underlies baseball batter expertise. NeuroImage, 123, 1-10.

SUMMARY OF THE INVENTION

Problems to be Solved by the Invention

However, the technique of Non-patent Literature 1 merely checks the ability to press a button and does not guarantee that the technique can properly evaluate the actual ability to perform batting. For example, even if a person and another person have the same speed of response and speed of judgment, they can hit a ball accurately if the pitch speed is low, but they cannot hit a ball accurately if the pitch speed is high. Such a problem arises not only when the ability to perform batting is evaluated, but also when the ability (motion performance) of animals (including humans) to make a motion in response to the movement of at least one moving body other than themselves is evaluated.

The present invention has been made in view of this point and an object thereof is to properly evaluate the motion performance of an animal that makes a motion in response to the movement of at least one moving body other than him/herself.

Means to Solve the Problems

In the present invention, the motion performance of an animal that makes a motion in response to the movement of at least one moving body other than the animal, which is a subject for evaluation, is evaluated. For this purpose, the motion data of the animal is acquired by manipulating the difficulty factor of the motion which is made by the animal in response to the movement of the moving body, and the motion performance of the animal is evaluated based on the motion data of the animal. It is to be noted that the motion data contains information indicating the timing of the motion of the animal.

Effects of the Invention

In this way, it is possible to properly evaluate the motion performance of an animal that makes a motion in response to the movement of at least one moving body other than him/herself.

DETAILED DESCRIPTION OF THE EMBODIMENTS

Figure 1:
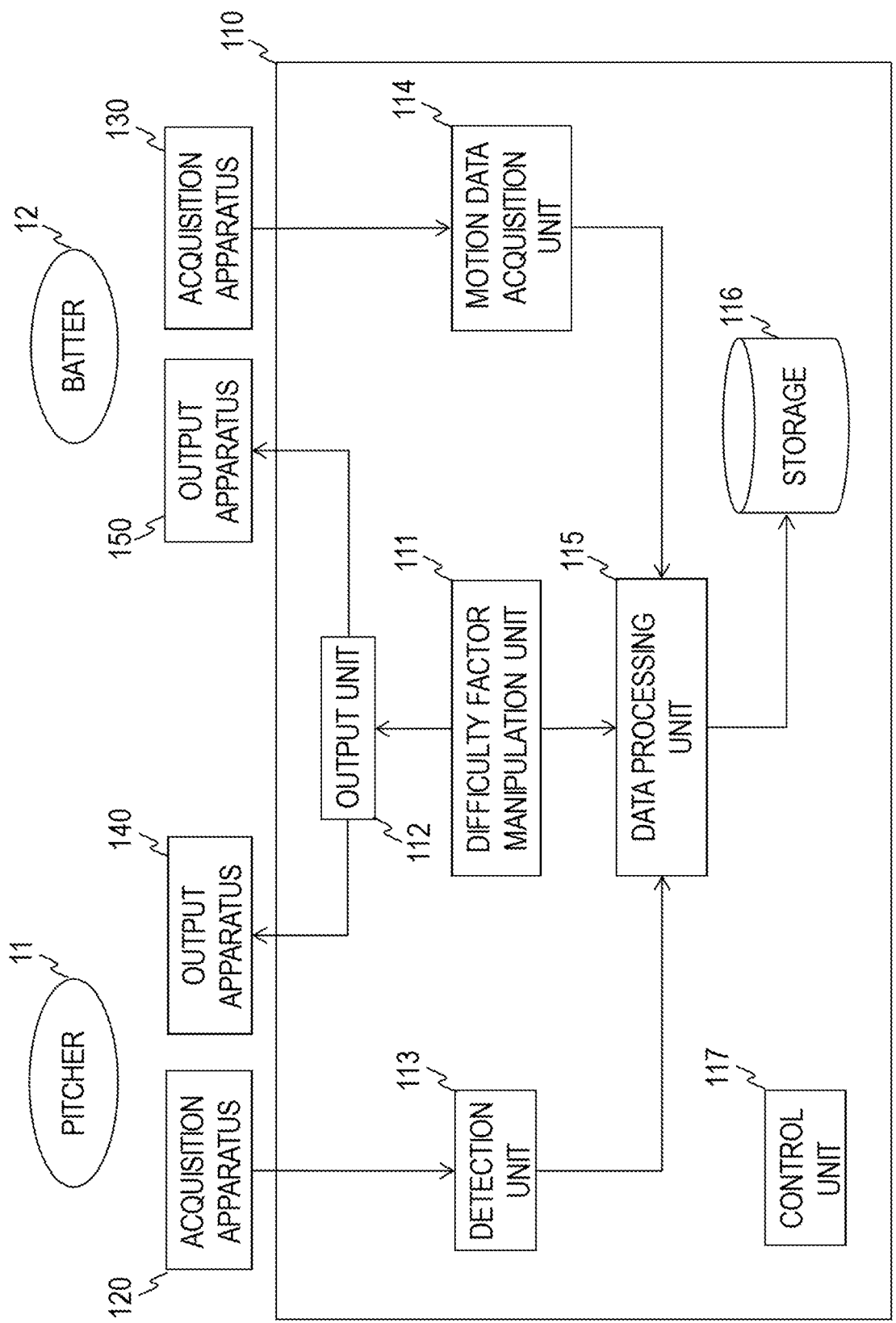
FIG. 1 is a block diagram for illustrating the functional configuration of a data acquisition apparatus of an embodiment.

The present invention will be described by taking baseball as an example. The present invention relates to a performance evaluation which is an evaluation of the motion performance of a batter who performs batting in response to a ball flying toward him/her and data acquisition which is used to evaluate the motion performance. That is, the present invention relates to a performance evaluation which is an evaluation of the motion performance of an animal that makes a motion in response to the movement of at least one moving body other than the animal and data acquisition which is used to evaluate the motion performance. In the case of baseball, "at least one moving body other than the animal" is a ball, "the movement of the moving body" is the movement of the flying ball, and "an animal that makes a motion" is a batter who performs batting. Hereinafter, embodiments of the present invention will be described with reference to the drawings.

First Embodiment

In a first embodiment, a performance evaluation apparatus and a performance evaluation method will be described, the performance evaluation apparatus being an apparatus that evaluates the motion performance of an animal that makes a motion and evaluates the motion performance of the animal when the motion is made in response to the movement of at least one moving body other than the animal. In the first embodiment, first, the general outlines of the performance evaluation apparatus are described, a performance evaluation which the performance evaluation apparatus makes is then specifically described using a batter of baseball or softball as an example, and the configuration and action of the performance evaluation apparatus are finally described.

[General Outlines]

The performance evaluation apparatus evaluates the motion performance of "animals (including humans)" that make a "motion" in response to the movement of at least one "moving body" other than themselves and outputs the evaluation result. In doing so, the performance evaluation apparatus evaluates the motion performance of an "animal" based on the motion data of the "animal" obtained by manipulating the difficulty factor of a "motion". It is to be noted that the "motion data" contains information indicating the timing of the motion of the "animal". Manipulation of the "difficulty factor" and acquisition of the "motion data" are performed by a data acquisition apparatus, which will be described later. A difference in the difficulty factor of a "motion" causes a difference in the motion data of an "animal" that makes the "motion". It can be considered that this difference in the motion data is caused based on the motion performance of the "animal" in making the "motion". Therefore, the performance evaluation apparatus of the present invention evaluates the motion performance of an "animal" based on the motion data of the "animal" obtained by manipulating the difficulty factor of a "motion".

A "motion" which an "animal" makes is a motion (for example, a "motion" that is made in accordance with the movement of a "moving body") that is made in response to the movement of at least one "moving body" other than the "animal". More specifically, a "motion" which an "animal" makes is a motion that is made in a scene in which a situation occurs where the "animal" has to coordinate his/her action with the movement of a "moving body" under time constraints in order to attain some kind of objective. Moreover, an evaluation of the motion performance of an "animal" means whether the "animal" can appropriately adjust a motion in the above-described scene and the degree thereof. The "moving body" may be an object (for example, a ball, a sword, a bamboo sword, or the like) other than a living thing, a part (for example, a hand, a foot, or the like) or the whole of a body of another animal, or a combination (for example, a first wearing a boxing glove or the like) of an object and a part or the whole of a body of another animal. Examples of such a "motion" are: a batting motion in baseball, softball, or the like; a ball returning (stroke) motion in tennis, table tennis, or the like; a receiving motion in volleyball or the like; a motion of a keeper who is trying to stop a ball kicked by a kicker in the scene of a PK or free kick in soccer; a motion of an opponent player who is tackling to stop the movement of a player with a ball in rugby, American football, or the like; a defensive motion that is made in response to an attack from an opponent in fencing, kendo, boxing, or the like; and an avoiding motion made by a driver of an automobile in response to a bicycle that ran out in front of the automobile.

A "difficulty factor" means a factor that determines the degree of difficulty in properly making a "motion". The "difficulty factor" may contain the speed of the movement of a "moving body", the magnitude of the movement of a "moving body", information on whether or not the same movement of a "moving body" is repeated more than once, information on whether or not the type of movement of a "moving body" is random, the high number of types of allowable "motions" that are made in response to the movement of a "moving body", and information on whether or not an "animal" is informed of all or part of information on the movement of a "moving body", such as the type thereof, in advance. In the example of baseball, the "difficulty factor" contains information on whether a pitch type is a fast pitch type or a slow pitch type, information on whether or not a batter is informed of a pitch type before batting, and the like.

The "motion data" may be any motion data as long as the motion data contains information indicating the timing of a "motion" of an "animal". For example, the "motion data" is time-series data of a physical quantity (data containing a physical quantity at more than one point in time), which indicates the movement of a part of a body of an "animal" or a movement associated with the movement of a part of a body of an "animal". Examples of a physical quantity indicating a movement are a position, acceleration, angular acceleration, speed, angular speed, tangential velocity, and the like. The value on the time axis of the "motion data" may be actual time or a value corresponding to actual time. For instance, the value on the time axis of the "motion data" may be the proportion ($\Delta t/(t2-t1)$) of the actual elapsed time ($\Delta t$) from a motion point in time t1 or a point in time t1+t0 near the motion point in time t1 in an actual time segment (t2−t1) from the motion point in time t1 of a "moving body" to a motion point in time t2 (where t2>t1), or the function value of the proportion ($\Delta t/(t2-t1)$). Here, t0 is a positive or negative constant.

An evaluation of motion performance based on the motion data of an "animal" obtained by manipulating the difficulty factor of a "motion" is made based on, for example, the timing of the "motion" indicated by the motion data. The performance evaluation apparatus evaluates the motion performance of a certain "animal" in a certain "motion", which the "animal" makes, based on, for example, a difference (for example, the magnitude of a difference) between the timing of a "specific event" in the "motion" of the "animal" when the difficulty factor is a certain "difficulty factor" and the timing of the "specific event" in the "motion" of the "animal" when the difficulty factor is a different "difficulty factor". A "specific event" means a specific state in a "motion". Examples of a "specific event" are: a state at the point in time when a "motion" was started; a state in which the speed, acceleration, or magnitude of the movement of an "animal" associated with a "motion" reaches a maximum; a state at the point in time when a "motion" was ended; and the like. It is to be noted that the "timing of a specific event" is a relative point in time relative to a specific "base point in time" in accordance with the movement of a "moving body". In addition to that described above, the performance evaluation apparatus may evaluate the motion performance of an "animal" based on, for example, a difference in the position of a "moving body" at the "timing of a specific event in a motion" when the difficulty factor of the "motion" is changed. That is, since a "moving body" moves, the position of the "moving body" changes over time. Therefore, when an "animal" makes a "motion" in response to the movement of a "moving body", the position of the "moving body" at the "timing of a specific event in the motion" varies in accordance with this timing. Thus, the performance evaluation apparatus may evaluate the motion performance of an "animal" based on this difference in position.

Example of a Batter's Motion Performance Evaluation

Hereinafter, a case will be illustrated where the performance evaluation apparatus evaluates the motion performance (the motion performance of a batting motion) of a "batter" based on the motion data of the "batter" obtained by manipulating the difficulty factor of "batting (a motion)" that is performed by the "batter (animal)" in response to a pitch (a moving body).

A "difficulty factor" in this example is a factor that determines the degree of difficulty in properly performing batting in response to a pitch. For instance, a "difficulty factor" is a combination of the pitch type of a ball which is thrown by a pitcher and information on whether or not a "batter" is informed of a pitch type before a pitch. In this example, it is assumed that there are two pitch types of balls which are thrown by a pitcher: a fast ball such as what is called a "straight ball" and a slow ball such as what is called a "change-up". In the following description, a fast ball is called a "fastball" and a slow ball is called a "slowball". Moreover, in the following description, a case where a "batter" is informed of a pitch type before a pitch is called a "known condition" and a case where a "batter" is not informed of a pitch type before a pitch and balls of a plurality of pitch types are randomly thrown is called an "unknown condition".

Figure 3:
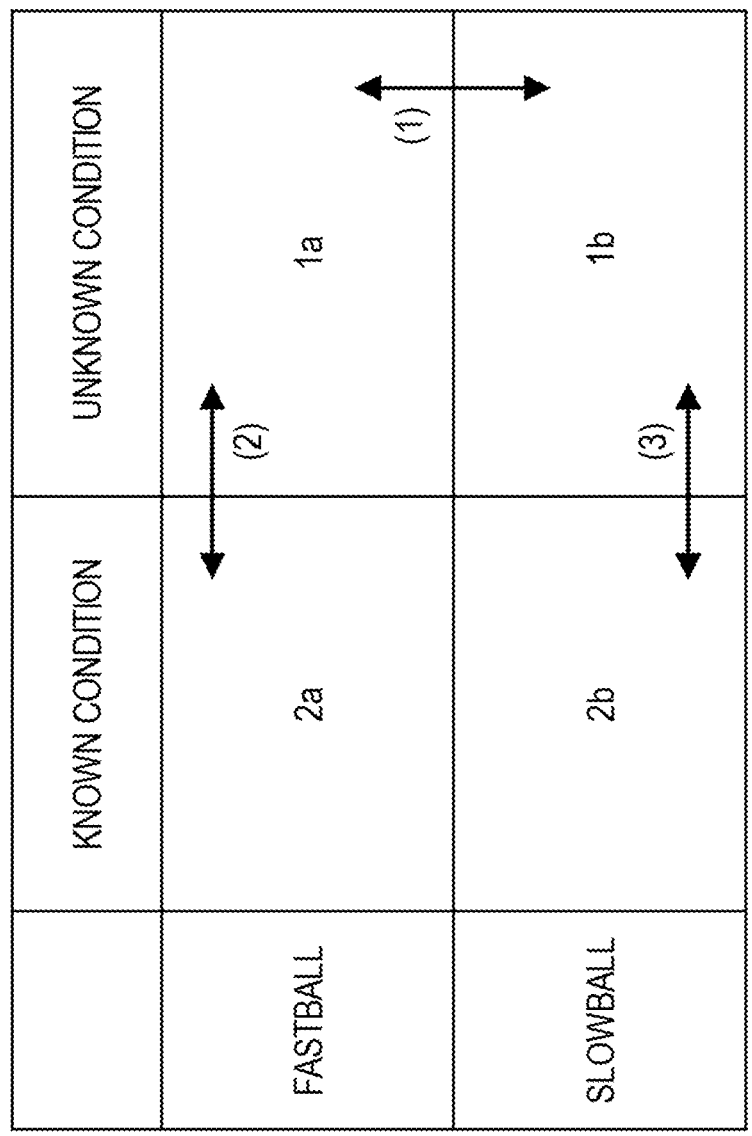
FIG. 3 is a diagram for illustrating the difficulty factor of batting which is performed by a batter.

As illustrated in FIG. 3, as a "difficulty factor" of this example, there are four difficulty factors: a difficulty factor $2a$ indicating a situation in which a fastball is thrown under the known condition, a difficulty factor $1a$ indicating a situation in which a fastball is thrown under the unknown condition, a difficulty factor $2b$ indicating a situation in which a slowball is thrown under the known condition, and a difficulty factor $1b$ indicating a situation in which a slowball is thrown under the unknown condition. In this example, the performance evaluation apparatus evaluates the motion performance of a batter based on, of the motion data of the batter obtained with these four difficulty factors ($1a$, $1b$, $2a$, $2b$), the motion data of the batter obtained with any difficulty factors.

More specifically, in a first specific example which will be described later, an example will be described in which the motion performance of a batter is evaluated based on the motion data of the batter obtained with the difficulty factor $1a$ indicating a situation in which a fastball is thrown under the unknown condition and the difficulty factor $1b$ indicating a situation in which a slowball is thrown under the unknown condition. Moreover, in a second specific example which will be described later, an example will be described in which the motion performance of a batter is evaluated based on the motion data of the batter obtained with the difficulty factor $1a$ indicating a situation in which a fastball is thrown under the unknown condition and the difficulty factor $2a$ indicating a situation in which a fastball is thrown under the known condition. Furthermore, in a third specific example which will be described later, an example will be described in which the motion performance of a batter is evaluated based on the motion data of the batter obtained with the difficulty factor $1b$ indicating a situation in which a slowball is thrown under the unknown condition and the difficulty factor $2b$ indicating a situation in which a slowball is thrown under the known condition.

The motion data of a batter obtained with the difficulty factor $1a$ indicating a situation in which a fastball is thrown under the unknown condition and the motion data of a batter obtained with the difficulty factor $1b$ indicating a situation in which a slowball is thrown under the unknown condition can be, for instance, motion data acquired under a condition where two pitch types, a fastball and a slowball, were randomly thrown without informing a batter of a pitch type before a pitch. Moreover, the motion data of a batter obtained with the difficulty factor $2a$ indicating a situation in which a fastball is thrown under the known condition and the motion data of a batter obtained with the difficulty factor $2b$ indicating a situation in which a slowball is thrown under the known condition can be, for example, motion data acquired under a condition where two pitch types, a fastball and a slowball, were randomly thrown to a batter informed of a pitch type before a pitch. It is to be noted that the motion data of a batter which was obtained under the known condition does not necessarily have to be motion data acquired under a condition where a plurality of pitch types were randomly thrown and may be motion data acquired under a condition where a certain one pitch type was thrown.

That is, the performance evaluation apparatus, which makes a batter's motion performance evaluation, of the first to third specific examples evaluates the motion performance of a "batter" based on the motion data, which was acquired under a condition where balls of a plurality of pitch types are randomly thrown without informing the "batter" of a pitch type, of the batter for at least one pitch type (in the first to third specific examples, at least one of a fastball thrown under the unknown condition and a slowball thrown under the unknown condition). The "motion data" in this example is time-series data of a physical quantity indicating the movement of a part (for example, a waist, a trunk, an arm, a fingertip, a shoulder, or the like) of a body of the "batter" or a movement (for example, the movement of the head of a bat) associated with the movement of a part of the body of the "batter". Such "motion data" contains information indicating the "motion" timing of the "batter". Examples of these movements are a rotary motion, a translational motion, and a motion containing a rotary motion component and a translational motion component. Examples of a physical quantity indicating a movement are a position, acceleration, angular acceleration, speed, angular speed, tangential velocity, and the like. For instance, an evaluation of motion performance is made based on the "timing of a specific event in a batting motion" indicated by "motion data". Examples of "a specific event in a batting motion" are a state at the point in time when a swing (a bat swing) was started, a state in which a swing speed peaks, a state in which swing acceleration peaks, a state in which a bat reaches a specific position, and the like. The "timing of a specific event in a batting motion" is a relative point in time (a relative time) relative to a "base point in time" corresponding to "the point in time when a pitch was made". The "base point in time" may be, for example, a specific point in time (for instance, the point in time when a front foot (a left foot if a pitcher is a right-handed pitcher) was moved away from the ground, the time at which the knee of a front leg reached the highest position, the point in time when the front foot touched the ground, a ball release point in time, or the like) in a series of pitcher's pitch motions (for instance, raising his/her leg, moving forward, planting his/her foot on the ground, and a ball release), or the point in time when the thrown ball reached a specific position (for instance, the point in time when a ball reached a position a predetermined distance from a pitcher's plate). The "timing of a specific event in a batting motion" may be represented by actual time or a value corresponding to actual time.

First Specific Example of a Batter's Motion Performance Evaluation

Figure 4:
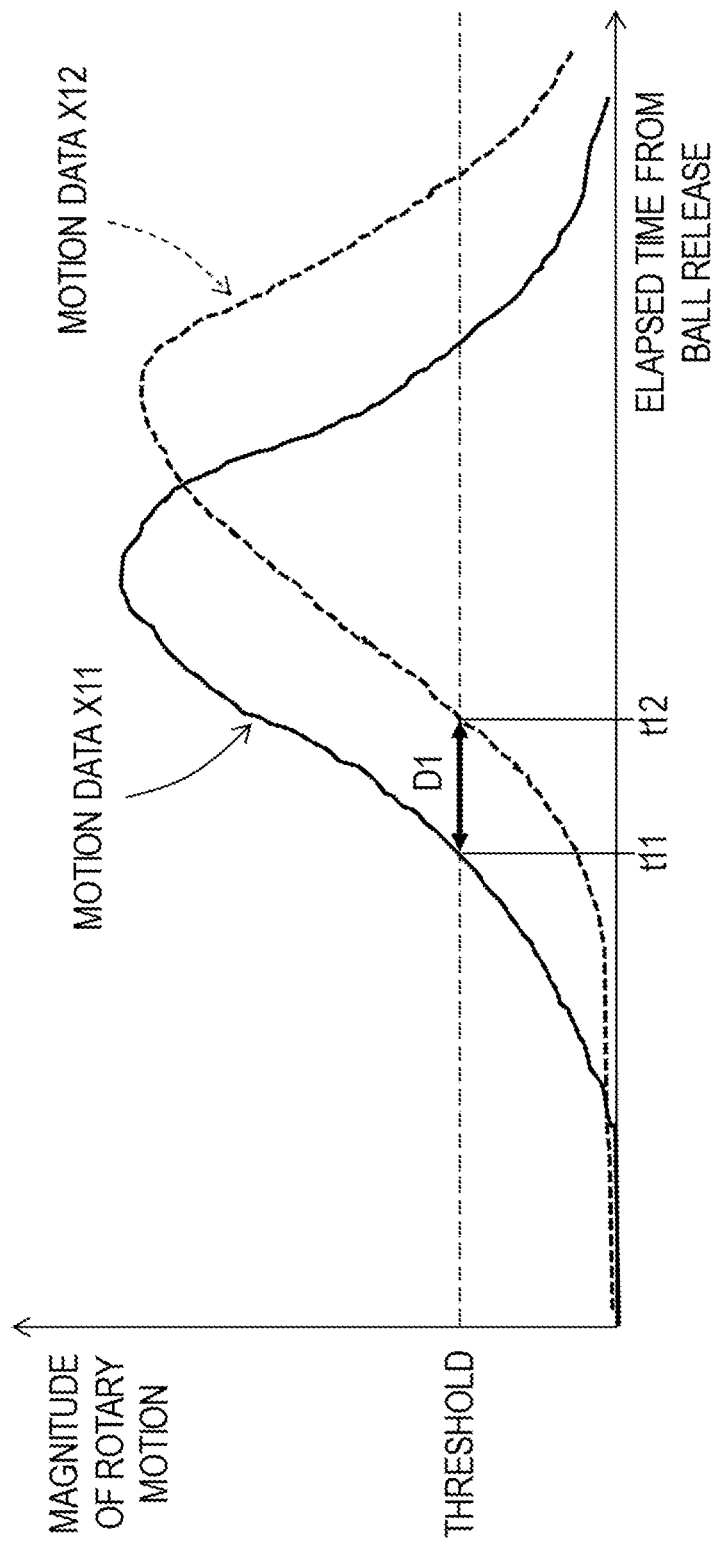
FIG. 4 is a diagram schematically showing the motion data of a batter obtained by manipulating the difficulty factor of batting which is performed by the batter.

In FIG. 4, the following relationship is schematically shown: the relationship between motion data X11 obtained from a "batter" under a condition based on the difficulty factor 1a (under a condition where a fastball is thrown under a condition where two pitch types are randomly thrown under the unknown condition) and motion data X12 obtained from the "batter" under a condition based on the difficulty factor 1b (under a condition where a slowball is thrown under a condition where two pitch types are randomly thrown under the unknown condition). The motion data X11 and X12 schematically shown in FIG. 4 are time-series data indicating the magnitude (for example, angular speed, tangential velocity, angular acceleration, or the like) of a rotary motion of a part (for example, a waist, a trunk, an arm, a fingertip, a shoulder, or the like) of a body of the "batter". The vertical axis of FIG. 4 represents the magnitude of this rotary motion and the horizontal axis represents the elapsed time from a ball release. In FIG. 4, the "motion data" obtained under a condition based on the difficulty factor 1a is shown by a solid line and the "motion data" obtained under a condition based on the difficulty factor 1b is shown by a broken line. In this example, the point in time when the magnitude of a rotary motion of a part of the body of the "batter" exceeded a threshold after a ball release is assumed to be the "timing of a specific event in a batting motion". The "timing of a specific event in a batting motion" is considered as a relative time of a swing start; therefore, in the following description, an explanation will be given using "a relative time of a swing start" as the "timing of a specific event in a batting motion". In the example of FIG. 4, a relative time of a swing start of the motion data X11 obtained under a condition based on difficulty factor 1a is t11 and a relative time of a swing start of the motion data X12 obtained under a condition based on the difficulty factor 1b is t12.

The inventor acquired a time series of the angular speed of a waist in batting performed by a top-level player and a young player in response to a straight ball (a fastball) and a change-up (a slowball) and analyzed the time series. As a result, a comparison between time-series variations in the angular speed of the top-level player who responded to a straight ball and time-series variations in the angular speed of the top-level player who responded to a change-up has revealed that there is a clear difference in the angular speed at a relatively early point in time after a pitcher's ball release. That is, this has revealed that one could argue that the top-level player determines a pitch type at an early point in time and starts motion control in accordance with the pitch type. On the other hand, a comparison between time-series variations in the angular speed of the young player who responded to a straight ball and time-series variations in the angular speed of the young player who responded to a change-up has revealed that there is almost no difference at an early time and a difference appears after a lapse of time. That is, this suggests that the young player could not determine a pitch type at an early stage, started a motion, and then tried to change motion control, noticing that the anticipated pitch type was wrong.

Based on these findings, when a plurality of fastballs or slowballs are thrown under the unknown condition, if a player is a player considered to be a "good batter" in an actual game like a top-level player, a difference between a relative time of a swing start of the player which is observed when a fastball is thrown and a relative time of a swing start of the player which is observed when a slowball is thrown is considered to be close to a difference between the elapsed time from a ball release of a fastball to arrival thereof at a home base and the elapsed time from a ball release of a slowball to arrival thereof at the home base. Thus, it can be estimated that the smaller a difference between a time difference between a relative time of a swing start of a batter which is observed when a fastball is thrown under the unknown condition and a relative time of a swing start of the batter which is observed when a slowball is thrown under the unknown condition and a time difference between the elapsed time from a ball release of a fastball to arrival thereof at the home base and the elapsed time from a ball release of a slowball to arrival thereof at the home base, the higher the ability of the batter to respond to different ball speeds.

Therefore, the performance evaluation apparatus of the first specific example evaluates the motion performance of a "batter" including his/her ability to respond to a ball speed, based on the motion data X11 of the "batter" for a fastball, acquired under a condition where balls of a plurality of pitch types are randomly thrown without informing the "batter" of a pitch type (a fastball under the unknown condition, a condition based on the difficulty factor 1a) and the motion data X12 of the batter for a slowball, acquired under a condition where balls of a plurality of pitch types are randomly thrown without informing the "batter" of a pitch type (a slowball under the unknown condition, a condition based on the difficulty factor 1b). More specifically, for example, the performance evaluation apparatus of the first specific example makes an evaluation in the following manner: the smaller a difference $|D1-D_{fc}|$ between a time difference $D1=|t11-t12|$ between the relative time (a relative time of a swing start) t11 of "a specific event in a batting motion", which is obtained from the motion data X11, and the relative time (a relative time of a swing start) t12 of "the specific event in a batting motion", which is obtained from the motion data X12, and a time difference $D_{fc}=|t_f-t_c|$ between the time $t_f$ from a point in time $t_{rf}$ when a fastball was pitched to a point in time $t_{bf}$ when the fastball arrives at a predetermined position $p_b$ near a batter's box and the time $t_c$ from a point in time $t_{rc}$ when a slowball was pitched to a point in time tbc when the slowball arrives at the predetermined position $p_b$ near the batter's box, the higher the ability (motion performance) to respond to different ball speeds. Here, the time difference $D1=|t11-t12|$ corresponds to "a difference between the elapsed time, which was acquired under a condition where balls of a plurality of pitch types are randomly thrown without informing a batter of a pitch type, from the time at which a fastball was pitched to a predetermined event in a batting action made by the batter in response to the fastball and the elapsed time, which was acquired under a condition where balls of a plurality of pitch types are randomly thrown without informing the batter of a pitch type, from the point in time when a slowball was pitched to the predetermined event in a batting action made by the batter in response to the slowball". Moreover, the time difference $D_{fc}=|t_f-t_c|$ corresponds to "a difference between the elapsed time from the point in time when a fastball was pitched to the point in time when the fastball arrives at a predetermined position near a batter's box and the elapsed time from the point in time when a slowball was pitched to the point in time when the slowball arrives at the predetermined position near the batter's box". Furthermore, for instance, when a "first value" is assumed to be a value less than a "second value", the performance evaluation apparatus of the first specific example makes an evaluation in the following manner: the ability of a "batter" with the difference $|D1-D_{fc}|$ whose value is the "first value" to respond to different ball speeds is higher than that of a "batter" with the difference $|D1-D_{fc}|$ whose value is the "second value". Here, $|\alpha|$ represents the absolute value of a. Since the relation $t_f < t_c$ always holds between a fastball and a slowball and the relation t11<t12 holds for almost all the batters even under the unknown condition, a time difference D1'=t11−t12 may be used in place of the time difference D1=|t11−t12| and a time difference $D_{fc}'=t_f-t_c$ may be used in place of the time difference $D_{fc}=|t_f-t_c|$, though virtually the same result would be obtained. Moreover, the point in time $t_{rf}$ when a fastball was pitched and the point in time $t_{rc}$ when a slowball was pitched are, for example, a specific point in time (for instance, a ball release point in time) in a series of pitcher's pitch motions (for instance, raising his/her leg, moving forward, planting his/her foot on the ground, a ball release, and the like), a point in time after a lapse of a predetermined time from a ball release point in time, a point in time a predetermined time earlier than a ball release point in time, the point in time when the thrown ball reached a specific position (for example, the point in time when the ball reached a position a predetermined distance from a pitcher's plate), and so forth. The predetermined position $p_b$ near the batter's box is, for example, a predetermined position on a home base (for instance, the front end or the like of the home base), a position a predetermined distance from the home base, the position of a catcher's mitt, or the like. The relative times t11 and t12 are relative points in time relative to a "base point in time". The performance evaluation apparatus of the first specific example outputs the evaluation result (the evaluation result of the motion performance including the ability to respond to a ball speed) based on the above-described difference $|D1-D_{fc}|$. For example, the performance evaluation apparatus may output the difference $|D1-D_{fc}|$ itself as the evaluation result, output the function value of the difference $|D1-D_{fc}|$ as the evaluation result, or output the evaluation result to the effect that "the ability to respond to different ball speeds is high" when the difference $|D1-D_{fc}|$ is less than a reference value and output the evaluation result to the effect that "the ability to respond to different ball speed is low" when the difference $|D1-D_{fc}|$ is greater than or equal to the reference value. In addition to those described above, the performance evaluation apparatus may evaluate the motion performance of a "batter" including his/her ability to respond to a ball speed by using (1) a distance P1=d(p11, p12) between a position p11 of a ball at the relative time t11 of "a specific event in a batting motion" indicated by the motion data X11 and a position p12 of a ball at the relative time t12 of "the specific event in a batting motion" indicated by the motion data X12 in place of the time difference D1, (2) a distance $P_{fc}$ between a position $p_c$ at which a slowball arrives after a lapse of the time $t_f$ from the point in time $t_{rc}$ when the slowball was pitched and the predetermined position $p_b$ near the batter's box where the batter performs batting in place of the time difference $D_{fc}$, and (3) a difference $|P1-P_{fc}|$ in place of the difference $|D1-D_{fc}|$, and output the evaluation result. Here, the distance $P_{fc}$ indicates how far a slowball is away from the position $p_b$ at the point in time when a fastball arrived at the position $p_b$ when the fastball and the slowball were pitched at the same time. Moreover, $d(\alpha, \beta)$ represents the distance between a and B.

Second Specific Example of a Batter's Motion Performance Evaluation

Figure 5:
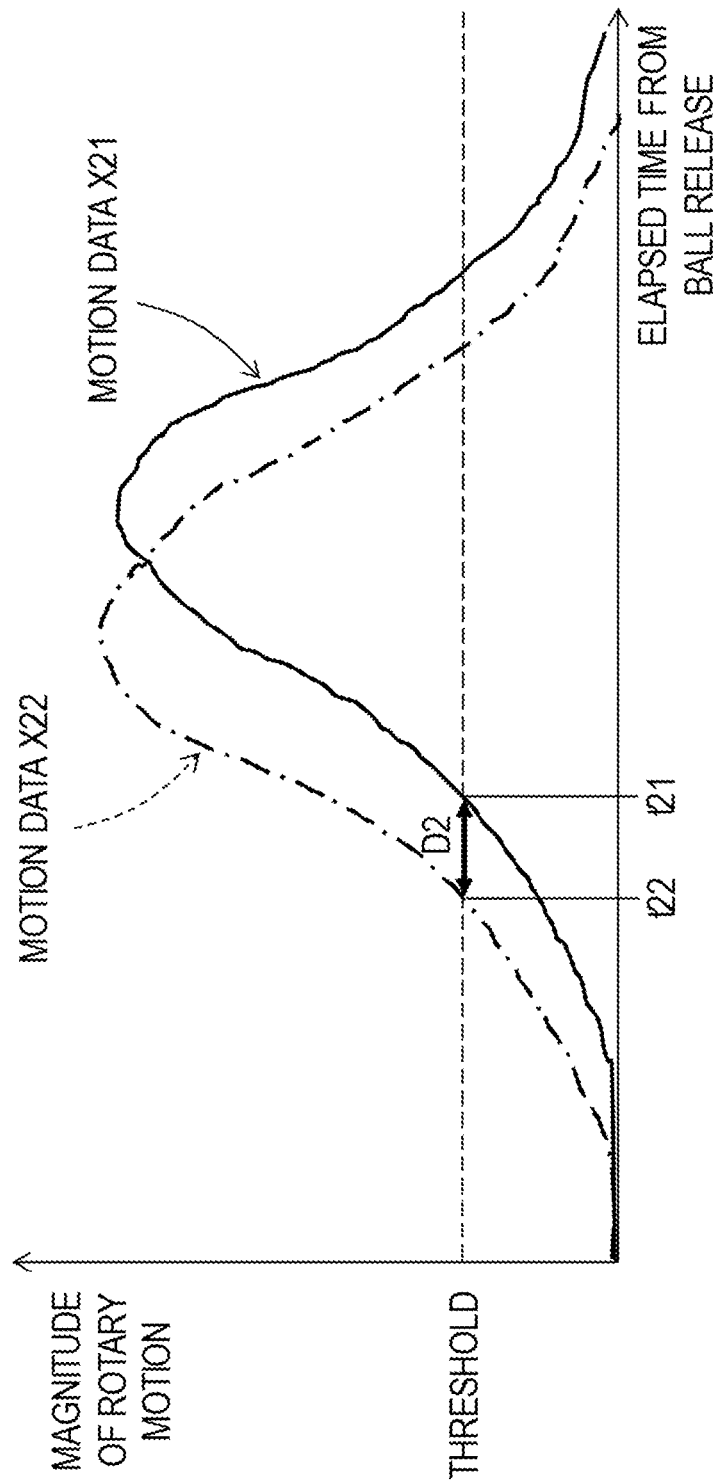
FIG. 5 is a diagram schematically showing the motion data of a batter obtained by manipulating the difficulty factor of batting which is performed by the batter.

In FIG. 5, the following relationship is schematically shown: the relationship between motion data X21 obtained from a "batter" under a condition based on the difficulty factor 1a (under a condition where a fastball is thrown under a condition where two pitch types are randomly thrown under the unknown condition) and motion data X22 obtained from the "batter" under a condition based on the difficulty factor 2a (under a condition where a fastball is thrown under a condition where two pitch types are randomly thrown under the known condition). The motion data X21 and X22, which are schematically shown in FIG. 5, also are time-series data indicating the magnitude of a rotary motion of a part of a body of the "batter". Also in FIG. 5, the vertical axis represents the magnitude of this rotary motion and the horizontal axis represents the relative time relative to a ball release point in time. In FIG. 5, the motion data X21 obtained under a condition based on the difficulty factor 1a is shown by a solid line and the motion data X22 obtained under a condition based on the difficulty factor 2a is shown by a broken line (an alternate long and short dashed line). Also in this example, the point in time when the magnitude of a rotary motion of a part of the body of the "batter" exceeded a threshold after a ball release is considered as a relative time of a swing start. In the example of FIG. 5, a relative time of a swing start of the motion data X21 obtained under a condition based on the difficulty factor 1a is t21 and a relative time of a swing start of the motion data X22 obtained under a condition based on the difficulty factor 2a is t22.

A starting time of time-series variations in motion data (for example, the angular speed of a waist) of a batter associated with a batting action is considered as the time at which a motion, which the batter makes after determining the movement of a ball, is exhibited. In general, the required time from a decision to start a motion, which is made in the brain, to the actual exhibition of the motion is about 200-250 msec, and it is presumed that there is no big difference in this time between a top-level player and a young player. Assume that a player makes a judgment (makes a judgment to start a motion after determining the movement of a ball) in substantially the same time irrespective of the speed of a ball; then, a top-level player who makes a judgment in a short time can accurately perform batting in response to a relatively fast ball. On the other hand, a young player who needs a long time to make a judgement cannot perform motion control in time in response to a ball that has reached fairly close to him/her when he/she has made a judgment, which makes it impossible for him/her to perform accurate batting.

An experiment conducted by the inventor has revealed that, when a relative time of a swing start is estimated under the known condition and the unknown condition, a difference in a relative time of a swing start between the known condition and the unknown condition is small when a batter is a top-level player. That is, a player who is considered to be a "good batter" in an actual game makes a quick judgment that a fast straight ball will come after a pitcher's ball release and starts a swing action predicting the time of arrival of the ball as in the case of a fastball thrown under the known condition even when he/she bats a fastball thrown under the unknown condition. Thus, it can be estimated that the smaller a time difference between a relative time of a swing start of a batter in response to a fastball thrown under the unknown condition and a relative time of a swing start of the batter in response to a fastball thrown under the known condition, the higher the ability of the batter to make a judgment about a ball speed (the ability of the batter to determine whether the thrown ball is a fastball).

Therefore, the performance evaluation apparatus of the second specific example evaluates the motion performance of a "batter" including his/her ability to determine whether the thrown ball is a fastball, based on the motion data X21 of the batter, who responds to a fastball, acquired under a condition where balls of a plurality of pitch types are randomly thrown without informing the "batter" of a pitch type (a fastball under the unknown condition, a condition based on the difficulty factor 1a) and the motion data X22 of the batter acquired under a condition where a fastball is thrown to the "batter" who is informed that a ball to be thrown is a fastball (a fastball under the known condition, a condition based on the difficulty factor 2a). More specifically, for example, the performance evaluation apparatus of the second specific example makes an evaluation in the following manner: the smaller a time difference D2=|t21−t22| between the relative time t21 of a swing start which is obtained from the motion data X21 and the relative time t22 of a swing start which is obtained from the motion data X22, the higher the ability (motion performance) to determine whether the thrown ball is a fastball. Here, the time difference D2=|t21−t22| corresponds to "a difference between the elapsed time, which was acquired under a condition where balls of a plurality of pitch types are randomly thrown without informing a batter of a pitch type, from the time at which a fastball was pitched to a swing start of the batter in response to the fastball and the elapsed time, which was acquired under a condition where a fastball is thrown to the batter who is informed that a ball to be thrown is a fastball, from the time at which the fastball was pitched to a swing start of the batter". Moreover, for instance, when a "third value" is assumed to be a value less than a "fourth value", the performance evaluation apparatus of the second specific example makes an evaluation in the following manner: the ability of a "batter" with the time difference D2 whose value is the "third value" to determine whether the thrown ball is a fastball is higher than that of a "batter" with the time difference D2 whose value is the "fourth value". Furthermore, the relative times t21 and t22 are relative points in time relative to a "base point in time". Moreover, the performance evaluation apparatus of the second specific example outputs the evaluation result (the evaluation result of the motion performance including the ability to determine whether the thrown ball is a fastball) based on the above-described time difference D2. For example, the performance evaluation apparatus of the second specific example may output the time difference D2 itself as the evaluation result, output the function value of the time difference D2 as the evaluation result, or output the evaluation result to the effect that "the ability to determine whether the thrown ball is a fastball is high" when the time difference D2 is less than a reference value and output the evaluation result to the effect that "the ability to determine whether the thrown ball is a fastball is low" when the time difference D2 is greater than or equal to the reference value. In addition to those described above, the performance evaluation apparatus of the second specific example may evaluate the motion performance of a "batter" including his/her ability to determine whether the thrown ball is a fastball, by using, in place of the time difference D2, a distance P2=d(p21, p22) between a position p21 of a ball at the relative time t21 in "a specific event in a batting motion" indicated by the motion data X21 and a position p22 of a ball at the relative time t22 of "the specific event in a batting motion" indicated by the motion data X22, and output the evaluation result.

Third Specific Example of a Batter's Motion Performance Evaluation

Figure 6A:
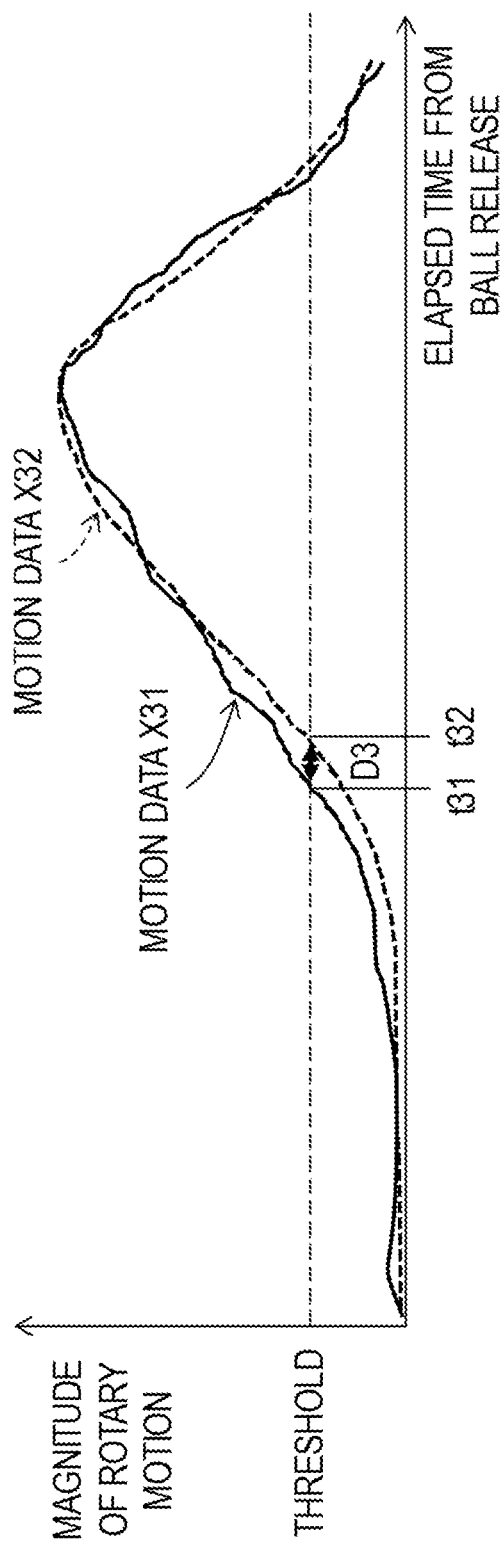
FIG. 6 is a diagram schematically showing the motion data of a batter obtained by manipulating the difficulty factor of batting which is performed by the batter.
Figure 6B:
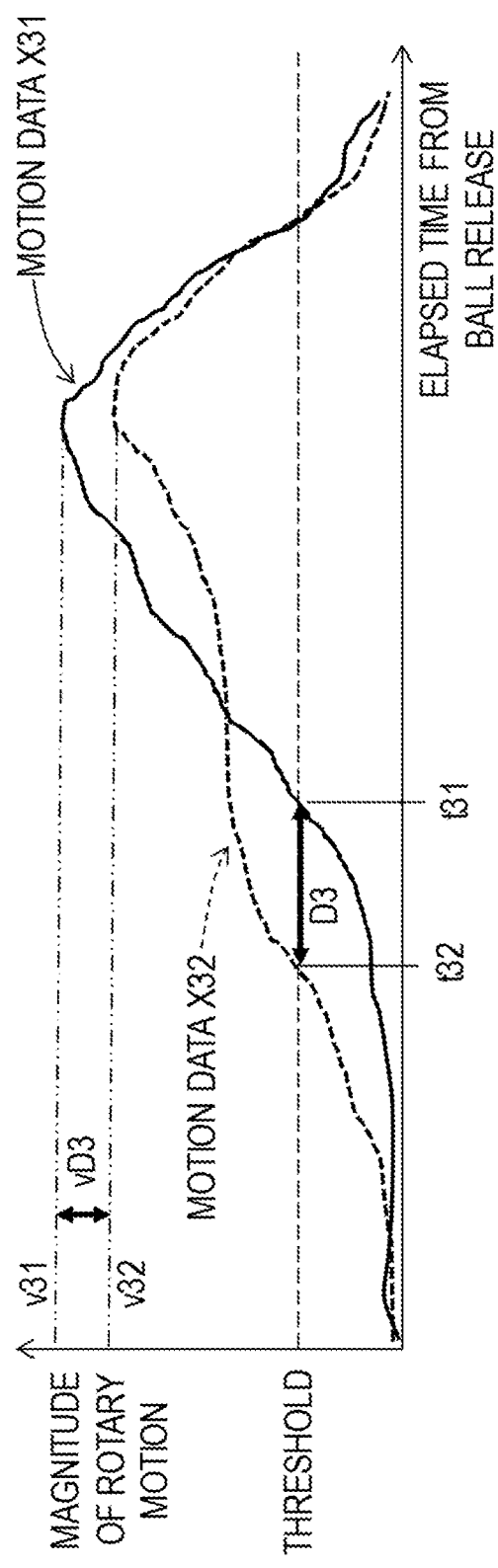

In FIGS. 6A and 6B, the following relationship is schematically shown: the relationship between motion data X32 obtained from a "batter" under a condition based on the difficulty factor 1b (under a condition where a slowball is thrown under a condition where two pitch types are randomly thrown under the unknown condition) and motion data X31 obtained from the "batter" under a condition based on the difficulty factor 2b (under a condition where a slowball is thrown under a condition where two pitch types are randomly thrown under the known condition). The motion data X31 and X32, which are schematically shown in FIGS. 6A and 6B, also are time-series data indicating the magnitude of a rotary motion of a part of a body of the "batter". Also in FIGS. 6A and 6B, the vertical axis represents the magnitude of this rotary motion and the horizontal axis represents the elapsed time from a ball release. In FIGS. 6A and 6B, the motion data X31 obtained under a condition based on the difficulty factor 2b is shown by a solid line and the motion data X32 obtained under a condition based on the difficulty factor 1b is shown by a broken line. Also in this example, the point in time when the magnitude of a rotary motion of a part of the body of the "batter" exceeded a threshold after a ball release is considered as a relative time of a swing start. In the example of FIGS. 6A and 6B, a relative time of a swing start of the motion data X31 obtained under a condition based on the difficulty factor 2b is t31 and a relative time of a swing start of the motion data X32 obtained under a condition based on the difficulty factor 1b is t32. Moreover, in the example of FIGS. 6A and 6B, the maximum value of a rotary motion of the motion data X31 obtained under a condition based on the difficulty factor 2b is v31 and the maximum value of a rotary motion of the motion data X32 obtained under a condition based on the difficulty factor 1b is v32.

An experiment conducted by the inventor has revealed that a relative time of a swing start in response to a change-up under the unknown condition differs even between players whose ability to perform batting is relatively high. Specifically, this has revealed that, about a change-up whose ball speed is low, the players whose ability to perform batting is relatively high are broadly divided into a type (a delay type) that makes a quick judgment that the ball speed is low after a pitcher's ball release, starts a batting action, appropriately delaying a swing start until the timing similar to the timing under the known condition, and makes a swing action similar to that under the known condition and a type (a modification type) that accurately performs batting by modifying the whole swing action, with an earlier swing start than that under the known condition. This difference can be said to be a difference in a method for coping with a situation in which an unexpected slow ball is thrown. Therefore, it can be estimated that a time difference between a relative time of a swing start in response to a slowball thrown under the unknown condition and a relative time of a swing start in response to a slowball thrown under the known condition indicates the type of a method by which a batter handles a slowball. Moreover, in addition to that described above, it can be estimated that a difference between the maximum value of the speed of a swing action in response to a slowball thrown under the unknown condition and the maximum value of the speed of a swing action in response to a slowball thrown under the known condition also indicates the type of a method by which a batter handles a slowball.

Therefore, the performance evaluation apparatus of the third specific example evaluates the motion performance of a "batter" including the type of a method to handle a slowball, based on the motion data X32 of the batter, who responds to a slowball, acquired under a condition where balls of a plurality of pitch types are randomly thrown without informing the "batter" of a pitch type (a slowball under the unknown condition, a condition based on the difficulty factor 1$b$) and the motion data X31 of the batter acquired under a condition where a slowball is thrown to the "batter" who is informed that a ball to be thrown is a slowball (a slowball under the known condition, a condition based on the difficulty factor 2$b$). More specifically, for example, the performance evaluation apparatus of the third specific example evaluates the type of a method to handle a slowball as the motion performance of a batter in accordance with a time difference $D3=|t31-t32|$ (based on the magnitude of the time difference D3) between the relative time t31 of a swing start which is obtained from the motion data X31 and the relative time t32 of a swing start which is obtained from the motion data X32. The relative times t31 and t32 are relative points in time relative to a "base point in time". Here, the time difference $D3=|t31-t32|$ corresponds to "a difference between the elapsed time, which was acquired under a condition where balls of a plurality of pitch types are randomly thrown without informing a batter of a pitch type, from the time at which a slowball was pitched to a swing start of the batter in response to the slowball and the elapsed time, which was acquired under a condition where a slowball is thrown to the batter who is informed that a ball to be thrown is a slowball, from the time at which the slowball was pitched to a swing start of the batter". The performance evaluation apparatus of the third specific example outputs the evaluation result (the evaluation result of the motion performance including the type of a method to handle a slowball) based on the above-described time difference D3. For example, the performance evaluation apparatus of the third specific example may output the time difference D3 itself as the evaluation result, output the function value of the time difference D3 as the evaluation result, or output the evaluation result to the effect that the "batter" is of the "delay type" when the time difference D3 is less than a reference value and output the evaluation result to the effect that the "batter" is of the "modification type" when the time difference D3 is greater than or equal to the reference value. In addition to those described above, the performance evaluation apparatus of the third specific example may evaluate the motion performance of a "batter" including the type of a method to handle a slowball, by using, in place of the time difference D3, a distance $P3=d(p31, p32)$ between a position p31 of a ball at the relative time t31 of "a specific event in a batting motion" indicated by the motion data X31 and a position p32 of a ball at the relative time t32 of "the specific event in a batting motion" indicated by the motion data X32, and output the evaluation result.

Furthermore, the performance evaluation apparatus of the third specific example may evaluate the type of a method by which a batter handles a slowball also in accordance with a difference $vD3=|v31-v32|$ between the maximum value v31 of a rotary motion which is obtained from the motion data X31 and the maximum value v32 of a rotary motion which is obtained from the motion data X32. In this case, the performance evaluation apparatus of the third specific example outputs the evaluation result (the evaluation result of the motion performance including the type of a method to handle a slowball) based not only on the above-described time difference D3, but also on the above-described difference vD3 in the maximum value of a rotary motion. For instance, the performance evaluation apparatus of the third specific example may output the time difference D3 itself and the difference vD3 itself in the maximum value of a motion as the evaluation result or output the function value based on the time difference D3 and the difference vD3 in the maximum value of a rotary motion as the evaluation result. Moreover, for example, the performance evaluation apparatus of the third specific example may output the evaluation result to the effect that the "batter" is of the "delay type" when the time difference D3 is less than a first reference value and output the evaluation result to the effect that the "batter" is of the "modification type" when the time difference D3 is greater than or equal to the first reference value and the difference vD3 in the maximum value of a rotary motion is greater than or equal to a second reference value. When the time difference D3 is greater than or equal to the first reference value and the difference vD3 in the maximum value of a rotary motion is less than the second reference value, since there is a possibility that the ability of the "batter" to perform batting is low, the performance evaluation apparatus of the third specific example may output no evaluation result or output the evaluation result to the effect that the "batter" is of neither the "delay type" nor the "modification type".

[Apparatus Configuration]

<<Performance Evaluation Apparatus 160>>

Figure 2:
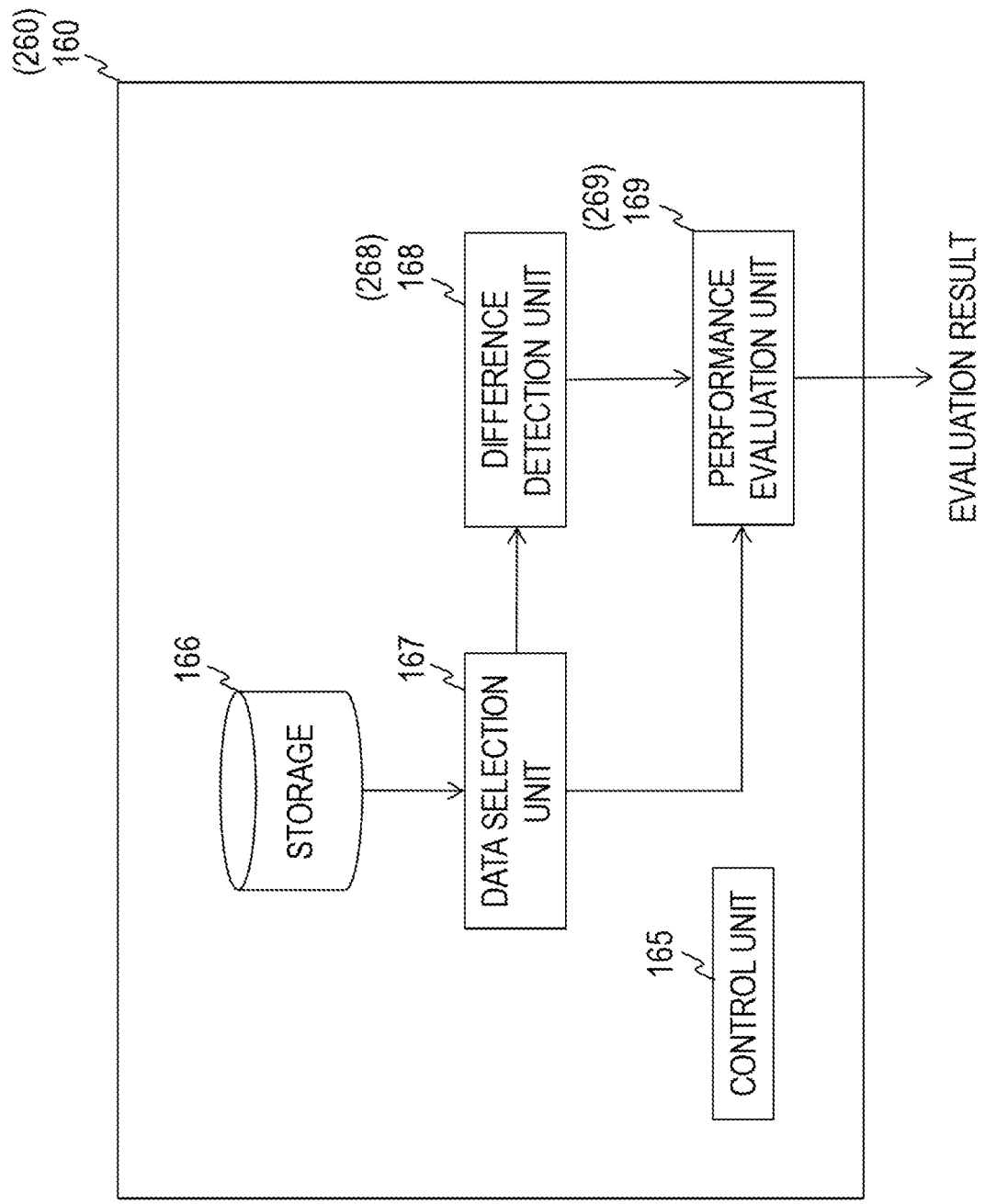
FIG. 2 is a block diagram for illustrating the functional configuration of a performance evaluation apparatus of the embodiment.

As illustrated in FIG. 2, a performance evaluation apparatus 160 includes a storage 166, a data selection unit 167, a difference detection unit 168, a performance evaluation unit 169, and a control unit 165.

<Performance Evaluation Processing>

Performance evaluation processing which is performed by the performance evaluation apparatus 160 is processing by which, based on the motion data of a motion of an animal that is a subject for evaluation, which was obtained by manipulating the difficulty factor of the motion of the animal, the motion performance of the animal is evaluated. In the above-described examples of a batter's motion performance evaluation, in the performance evaluation processing, based on the motion data of a batter obtained by manipulating the difficulty factor in the above-described manner, the motion performance of the batter is evaluated. That is, more specifically, the performance evaluation apparatus 160 evaluates the batter's motion performance by operating in accordance with any one of the above-described first to third specific examples based on the motion data of a batter who is a subject for evaluation. The performance evaluation apparatus 160 executes each of the following processing in accordance with control by the control unit 165.

<<Storage of Records (Step S166)>>

A table made up of a plurality of records stored in a storage 116 of a data acquisition apparatus 110 is stored in the storage 166 of the performance evaluation apparatus 160 (FIG. 2).

<<Data Selection Processing (Step S167)>>

The data selection unit 167 extracts a tuple of records of one batter 12, which correspond to one set of different difficulty factors, from the table stored in the storage 166. "One set of different difficulty factors" may be determined in accordance with input, may be determined in a predetermined sequence, or may be determined randomly. For example, when records corresponding to the difficulty factors illustrated in FIG. 3 were obtained, "one set of different difficulty factors" is any one of a set (1) of the difficulty factors 1a and 1b, a set (2) of the difficulty factors 1a and 2a, and a set (3) of the difficulty factors 1b and 2b. The data selection unit 167 may extract one record for one difficulty factor or extract a plurality of records for one difficulty factor. The data selection unit 167 transmits information indicating one set of different difficulty factors to the performance evaluation unit 169 and transmits records corresponding to the one set of different difficulty factors to the difference detection unit 168.

<<Difference Detection Processing (Step S168)>>

The difference detection unit 168 obtains, using the motion data of the records corresponding to the "one set of different difficulty factors" transmitted thereto, evaluation information E for evaluating the motion performance of the batter 12 and outputs the evaluation information E.

For instance, when one tuple of records (that is, two records) corresponding to the set (1) of the difficulty factors 1a and 1b was transmitted, the difference detection unit 168 obtains, using these records, the relative time t11 of a swing start (a specific event in a batting motion) of the motion data X11 corresponding to the difficulty factor 1a and the relative time t12 of a swing start of the motion data X12 corresponding to the difficulty factor 1b. The difference detection unit 168 uses, as a relative time of a swing start, a relative point in time, of the point in time when a physical quantity (for example, angular speed or the like) indicated by the motion data contained in a record exceeded a threshold, relative to a base point in time of the record, for example (the same applies hereinafter). Moreover, the difference detection unit 168 calculates the time difference $D1=|t12-t11|$ between the relative time t11 and the relative time t12. Furthermore, the difference detection unit 168 obtains, using the ball speeds contained in the one tuple of records transmitted thereto, the time difference $D_{fc}$ between the elapsed time from a ball release of a fastball to arrival thereof at a predetermined position on the home base and the elapsed time from a ball release of a slowball to arrival thereof at the predetermined position on the home base, which correspond to these records. Then, the difference detection unit 168 calculates the difference $|D1-D_{fc}|$ between the time difference D1 and the time difference $D_{fc}$ and outputs the difference $|D1-D_{fc}|$ as the evaluation information E. For instance, when two or more tuples of records (that is, three or more records) corresponding to the set (1) of the difficulty factors 1a and 1b were transmitted, the difference detection unit 168 may obtain the difference $|D1-D_{fc}|$ for each of the tuples of records corresponding to the set (1) of the difficulty factors 1a and 1b and output a plurality of differences $|D1-D_{fc}|$ thus obtained as the evaluation information E. Alternatively, the difference detection unit 168 may output, as the evaluation information E, the mean value of the differences $|D1-D_{fc}|$ obtained for the tuples of records corresponding to the set (1) of the difficulty factors 1a and 1b.

For instance, when one tuple of records corresponding to the set (2) of the difficulty factors 1a and 2a was transmitted, the difference detection unit 168 obtains, using these records, the relative time t21 of a swing start of the motion data X21 corresponding to the difficulty factor 1a and the relative time t22 of a swing start of the motion data X22 corresponding to the difficulty factor 2a. Moreover, the difference detection unit 168 calculates the time difference $D2=|t21-t22|$ between the relative time t21 and the relative time t22 and outputs the time difference D2 as the evaluation information E. For example, when two or more tuples of records corresponding to the set (2) of the difficulty factors 1a and 2a were transmitted, the difference detection unit 168 may obtain the time difference D2 for each of the tuples of records corresponding to the set (2) of the difficulty factors 1a and 2a and output a plurality of time differences D2 thus obtained as the evaluation information E. Alternatively, the difference detection unit 168 may output, as the evaluation information E, the mean value of the time differences D2 obtained for the tuples of records corresponding to the set (2) of the difficulty factors 1a and 2a.

For example, when one tuple of records corresponding to the set (3) of the difficulty factors 1b and 2b was transmitted, the difference detection unit 168 obtains, using these records, the relative time t31 of a swing start of the motion data X31 corresponding to the difficulty factor 2b and the relative time t32 of a swing start of the motion data X32 corresponding to the difficulty factor 1b. Moreover, the difference detection unit 168 calculates the time difference $D3=|t31-t32|$ between the relative time t31 and the relative time t32 and outputs the time difference D3 as the evaluation information E. For instance, when two or more tuples of records corresponding to the set (3) of the difficulty factors 1b and 2b were transmitted, the difference detection unit 168 may obtain the time difference D3 for each of the tuples of records corresponding to the set (3) of the difficulty factors 1b and 2b and output a plurality of time differences D3 thus obtained as the evaluation information E. Alternatively, the difference detection unit 168 may output, as the evaluation information E, the mean value of the time differences D3 obtained for the tuples of records corresponding to the set (3) of the difficulty factors 1b and 2b.

Moreover, for instance, when one tuple of records corresponding to the set (3) of the difficulty factors 1b and 2b was transmitted, the difference detection unit 168 may also obtain, using these records, the maximum value v31 of a rotational speed of the motion data X31 corresponding to the difficulty factor 2b and the maximum value v32 of a rotational speed of the motion data X32 corresponding to the difficulty factor 1b. In this case, the difference detection unit 168 also calculates the difference $vD3=|v31-v32|$ between the maximum value v31 of a rotational speed and the maximum value v32 of a rotational speed and outputs the evaluation information E containing the difference vD3. In this case, for example, the difference detection unit 168 may obtain the time difference D3 and the difference vD3 in the maximum value of a rotational speed for each of the tuples of records corresponding to the set (3) of the difficulty factors 1b and 2b and output, as the evaluation information E, a plurality of time differences D3 thus obtained and a plurality of differences vD3 thus obtained. Alternatively, the difference detection unit 168 may output, as the evaluation information E, the mean value of the time differences D3 obtained for the tuples of records corresponding to the set (3) of the difficulty factors 1b and 2b and the mean value of the differences vD3 in the maximum value of a rotational speed obtained for the tuples of records corresponding to the set (3) of the difficulty factors 1b and 2b.

The evaluation information E is input to the performance evaluation unit 169.

<<Performance Evaluation Processing (Step S169)>>

The performance evaluation unit 169 uses, as input, the information indicating the one set of different difficulty factors transmitted thereto and the evaluation information E corresponding to the information and outputs the evaluation result of motion performance including the details of an evaluation corresponding to the one set of different difficulty factors. For example, when the information indicating the set (1) of the difficulty factors 1a and 1b was input, the performance evaluation unit 169 outputs the evaluation result based on the evaluation information E corresponding to the information as the evaluation result of motion performance including the ability to respond to a ball speed. A specific example of this evaluation result is the same as the above-described evaluation result based on the difference $|D1-D_{fe}|$, which is treated as the evaluation information E. For instance, when the information indicating the set (2) of the difficulty factors 2a and 1a was input, the performance evaluation unit 169 outputs the evaluation result based on the evaluation information E corresponding to the information as the evaluation result of motion performance including the ability to determine whether the thrown ball is a fastball. A specific example of this evaluation result is the same as the above-described evaluation result based on the time difference D2. For example, when the information indicating the set (3) of the difficulty factors 2b and 1b was input, the performance evaluation unit 169 outputs the evaluation result based on the evaluation information E corresponding to the information as the evaluation result of motion performance including the type of a method to handle a slowball. A specific example of this evaluation result is the same as the above-described evaluation result based on the time difference D3 or the above-described evaluation result based on the time difference D3 and the difference vD3.

The performance evaluation apparatus 160 may repeat the processing from Step S167 to Step S169 more than once. In this case, the performance evaluation unit 169 may output a plurality of evaluation results without changing them or output statistical information of a plurality of evaluation results thus obtained.

Second Embodiment

In a second embodiment, data acquisition apparatus and method will be described, the data acquisition apparatus and method acquiring motion data for evaluating the motion performance of an animal that makes a motion and acquiring motion data for evaluating the motion performance of the animal when the motion is made in response to the movement of at least one moving body other than the animal. As in the first embodiment, a description will be given below using a batter of baseball or softball as an example.

<Configuration>

<<Data Acquisition Apparatus 110>>

As illustrated in FIG. 1, a data acquisition apparatus 110 of the present embodiment includes a difficulty factor manipulation unit 111, an output unit 112, a detection unit 113, a motion data acquisition unit 114, a data processing unit 115, a storage 116, and a control unit 117. The detection unit 113 is connected to an acquisition apparatus 120, the motion data acquisition unit 114 is connected to an acquisition apparatus 130, and the output unit 112 is connected to output apparatuses 140 and 150.

<<Acquisition Apparatus 120>>

The acquisition apparatus 120 is an apparatus that acquires data for detecting a "base point in time" corresponding to a ball release point in time and a ball speed. An example of the acquisition apparatus 120 is a sensor (for example, an acceleration sensor, a speed sensor, a gyroscope sensor, a magnetic sensor, or the like) that is attached to a part (for example, a fingertip, a shoulder, or a foot) of a body of a pitcher 11 or a ball and detects the movement of the part of the body or the movement of the ball. Another example of the acquisition apparatus 120 is a camera that acquires images for acquiring positional information (for example, the position of a reflective marker or the like attached to a part of the body of the pitcher 11 or the ball) of a part of the body of the pitcher 11 or the ball by motion capture or the like. Moreover, a high-speed camera may be used as the acquisition apparatus 120. In addition to those described above, a camera or sensor for acquiring positional information of a part of the body of the pitcher 11 or the ball by using an existing technique such as Kinect (a registered trademark) may be used as the acquisition apparatus 120.

<<Acquisition Apparatus 130>>

The acquisition apparatus 130 is an apparatus for acquiring the motion data of a batter 12. An example of the acquisition apparatus 130 is a sensor (for example, an acceleration sensor, a speed sensor, a gyroscope sensor, a magnetic sensor, or the like) that is attached to a part (for example, a waist, a trunk, an arm, a fingertip, a shoulder, or the like) of a body of the batter 12 or a bat (for example, the head or grip of the bat, or the like) and detects a physical quantity (for example, a position, acceleration, angular acceleration, speed, angular speed, tangential velocity, or the like) indicating the movement (for example, the magnitude, speed, or the like of a rotary motion) of the part of the body or the bat. Another example of the acquisition apparatus 130 is a camera that acquires images for acquiring positional information (for example, the position of a reflective marker or the like attached to a part of the body of the batter 12 or the bat) of a part of the body of the batter 12 or the bat by motion capture or the like. Moreover, a high-speed camera may be used as the acquisition apparatus 130. In addition to those described above, a camera or sensor for acquiring positional information of a part of the body of the batter 12 or a bat by using an existing technique such as Kinect may be used as the acquisition apparatus 130.

<<Output Apparatuses 140 and 150>>

The output apparatus 140 is an apparatus that provides the pitcher 11 with an instruction in accordance with a difficulty factor, and the output apparatus 150 is an apparatus that outputs, to the batter 12, information in accordance with a difficulty factor. For example, the output apparatus 140 provides the pitcher 11 with an instruction on, for example, the pitch type of a ball (for instance, a straight ball (a fastball) or a change-up (a slowball)) which the pitcher 11 throws next. For instance, the output apparatus 150 presents, to the batter 12, the pitch type of a ball which is thrown next in the case of a difficulty factor with the known condition, but the output apparatus 150 does not present, to the batter 12, the pitch type of a ball which is thrown next in the case of a difficulty factor with the unknown condition. The output apparatuses 140 and 150 may be displays and the like that display information by text or images, wireless earphones and the like that output information by speech, or apparatuses that output information by vibrations or other stimuli.

<Data Acquisition Processing>

Next, data acquisition processing will be described. In the data acquisition processing, with the aim of evaluating the motion performance of the batter 12, the data acquisition apparatus 110 acquires the motion data of the batter 12 by manipulating the difficulty factor of batting which is performed by the batter 12. The data acquisition apparatus 110 (FIG. 1) acquires motion data based on a batting action which is made (in response to a pitch actually made by a pitcher) in a real environment. The data acquisition apparatus 110 executes each of the following processing under the control of the control unit 117.

<<Setting of a Difficulty Factor (Step S111)>>

The difficulty factor manipulation unit 111 selects a specific difficulty factor (for example, any one of the difficulty factors 1a, 1b, 2a, and 2b of FIG. 3) and outputs information indicating the selected difficulty factor. The information indicating the difficulty factor is transmitted to the output unit 112 and the data processing unit 115. For example, when an evaluation of the performance of the first to third specific examples described in the first embodiment is needed, it is only necessary to determine in advance the pitch order of pitch types using random numbers or the like, so that two pitch types, a fastball and a slowball, of a plurality of pitches are randomly thrown, and select a pitch type in accordance with the pitch order determined in advance. In doing so, it is only necessary to use different random numbers under the unknown condition and the known condition.

<<Output Processing (Step S112)>>

The output unit 112 transmits, to the output apparatus 140, information for providing the pitcher 11 with an instruction in accordance with the information indicating the difficulty factor, which was transmitted thereto. Moreover, when there is information that is presented to the batter 12, the output unit 112 transmits the information to the output apparatus 150. The output apparatus 140 presents the information transmitted thereto to the pitcher 11. The output apparatus 150 presents the information transmitted thereto to the batter 12. For example, when the information indicating the difficulty factor 2a was transmitted, the output unit 112 transmits, to the output apparatus 140, information to the effect that the pitcher 11 throws a fastball next and transmits, to the output apparatus 150, information to the effect that a fastball is thrown next. In this case, the output apparatus 140 provides the pitcher 11 with an instruction to throw a fastball next and the output apparatus 150 presents, to the batter 12, information to the effect that a fastball is thrown next. For example, when the information indicating the difficulty factor 2b was transmitted, the output unit 112 transmits, to the output apparatus 140, information to the effect that the pitcher 11 throws a slowball next and transmits, to the output apparatus 150, information to the effect that a slowball is thrown next. In this case, the output apparatus 140 provides the pitcher 11 with an instruction to throw a slowball next and the output apparatus 150 presents, to the batter 12, information to the effect that a slowball is thrown next. For example, when the information indicating the difficulty factor 1a was transmitted, the output unit 112 transmits, to the output apparatus 140, information to the effect that the pitcher 11 throws a fastball next, but does not transmit, to the output apparatus 150, information on the pitch type of a ball which is thrown next. In this case, the output apparatus 140 provides the pitcher 11 with an instruction to throw a fastball next, but the output apparatus 150 does not present, to the batter 12, information on the next pitch type. For example, when the information indicating the difficulty factor 1b was transmitted, the output unit 112 transmits, to the output apparatus 140, information to the effect that the pitcher 11 throws a slowball next, but does not transmit, to the output apparatus 150, information on the pitch type of a ball which is thrown next. In this case, the output apparatus 140 provides the pitcher 11 with an instruction to throw a slowball next, but the output apparatus 150 does not present, to the batter 12, information on the next pitch type.

<<Detection Processing (Step S113)>>

The pitcher 11 makes a pitch of a pitch type in accordance with the instruction presented by the output apparatus 140. Data on a pitch action of the pitcher 11 or the movement of a ball is acquired by the acquisition apparatus 120 and transmitted to the detection unit 113. The detection unit 113 detects a "base point in time" corresponding to a ball release point in time and a ball speed based on the data transmitted thereto, and transmits information that identifies the "base point in time" and the ball speed to the data processing unit 115. The ball speed may be a ball speed at a ball release point in time or a ball speed observed after a ball release. The ball speed at a ball release point in time may be detected from the movement of a ball or detected from the movement of the fingertip of a pitcher. The ball speed observed after a ball release is detected from the movement of a ball. For instance, the detection unit 113 detects a ball release point in time as a "base point in time", detects a ball speed at the ball release point in time, and transmits information that identifies the ball release point in time and the ball speed to the data processing unit 115. The "base point in time" may be actual time or a value corresponding to actual time.

<<Motion Data Acquisition Processing (Step S114)>>

The batter 12 performs batting in response to the ball thrown by the pitcher 11 in Step S113. The acquisition apparatus 130 acquires the motion data of the batter 12 associated with this batting. The motion data is a physical quantity indicating the movement of a part of the body of the batter 12. The motion data at each point in time is transmitted to the motion data acquisition unit 114, and the motion data acquisition unit 114 transmits the motion data at each point in time to the data processing unit 115 as time-series motion data. It is to be noted that the time on the motion data acquisition unit 114 and the time on the detection unit 113 are synchronized with each other. A specific example of the motion data has been described above.

<<Data Processing (Step S115)>>

The information indicating the difficulty factor, which was transmitted in Step S111, the information, which was transmitted in Step S113, that identifies the "base point in time" and the ball speed, and the time-series motion data transmitted in Step S114 are input to the data processing unit 115. The data processing unit 115 stores, in the storage 116, a record of the difficulty factor, the base point in time, the ball speed, and the motion data which are indicated by these pieces of information and motion data and correlated with one another.

The data acquisition apparatus 110 repeats the processing from Step S111 to Step S115 more than once under the control of the control unit 117. The data acquisition apparatus 110 acquires the motion data of the batter 12 by manipulating the difficulty factor in this way and stores, in the storage 116, a table made up of records, each being made up of a difficulty factor, a base point in time, a ball speed, and motion data which are correlated with one another. As an example, when the processing from Step S111 to Step S115 is repeated for one batter 12 N times (N is an integer greater than or equal to 2), a table is stored in the storage 116, the table in which an identifier for the batter 12, a difficulty factor (1a, 1b, 2a, 2b), a base point in time (to-1-1 to to-1-N), a ball speed (v-1-1 to v-1-N), and motion data (data-1-1 to data-1-N) are correlated with one another as follows.

TABLE 1

| Batter identifier | Difficulty factor | Base point in time | Ball speed | Motion data |
|---|---|---|---|---|
| b-1 | 2a | $t_0$-1-1 | v-1-1 | data-1-1 |
| b-1 | 1b | $t_0$-1-2 | v-1-2 | data-1-2 |
| ... | ... | ... | ... | ... |
| b-1 | 2b | $t_0$-1-N | v-1-N | data-1-N |

The data acquisition apparatus 110 may repeat the processing from Step S111 to Step S115 more than once for a plurality of batters 12. For example, when the processing from Step S111 to Step S115 is repeated N times (N is an integer greater than or equal to 2) for M batters 12 (M is an integer greater than or equal to 2), a table is stored in the storage 116, the table in which an identifier for the batter 12, a difficulty factor (1a, 1b, 2a, 2b), a base point in time (to-1-1 to to-M-N), a ball speed (v-1-1 to v-M-N), and motion data (data-1-1 to data-M-N) are correlated with one another as follows.

TABLE 2

| Batter identifier | Difficulty factor | Base point in time | Ball speed | Motion data |
|---|---|---|---|---|
| b-1 | 2a | $t_0$-1-1 | v-1-1 | data-1-1 |
| b-1 | 1b | $t_0$-1-2 | v-1-2 | data-1-2 |
| ... | ... | ... | ... | ... |
| b-1 | 2b | $t_0$-1-N | v-1-N | data-1-N |
| b-2 | 1a | $t_0$-2-1 | v-2-1 | data-2-1 |
| ... | ... | ... | ... | ... |
| b-M | 1b | $t_0$-M-N | v-M-N | data-M-N |

Third Embodiment

In the second embodiment, an embodiment in which motion data is acquired from a batting motion under a real environment has been described; motion data may be acquired from a batting motion which is made under a VR environment. As an example, an embodiment will be described as a third embodiment in which motion data observed when a batter 12 wears a head-mounted display and makes a motion of actually hitting a virtual ball thrown by a VR pitcher under a virtual environment is acquired.
<Configuration>

The configuration of a data acquisition apparatus of the third embodiment is the same as the configuration of the data acquisition apparatus of the second embodiment except for the configuration of the acquisition apparatus 120 and the configuration of the output apparatus 150 and is illustrated in FIG. 1.
<<Output Apparatus 150>>

The output apparatus 150 is a head-mounted display. The output apparatus 150 is an apparatus that presents images of a pitcher who is throwing a ball and images of the ball thrown by the pitcher in addition to outputting information in accordance with a difficulty factor to the batter 12 as in the case of the output apparatus 150 of the second embodiment. The apparatus that presents images is a head-mounted display that presents a VR space, that is, an apparatus that presents three-dimensional images which allow a batter to view the magnitude, depth, and movement of images of a pitcher who is throwing a ball and the ball thrown by the pitcher, which are the same as the magnitude, depth, and movement of a pitcher who is actually throwing a ball and the ball actually thrown by the pitcher, even when the batter views in any direction from any position by rotating his/her head or moving.
<<Acquisition Apparatus 120>>

The acquisition apparatus 120 is an apparatus that acquires image information of images of a pitcher who is throwing a ball and the ball thrown by the pitcher in addition to detecting a "base point in time" corresponding to a ball release point in time and a ball speed as in the case of the acquisition apparatus 120 of the second embodiment. Since the image information which the acquisition apparatus 120 acquires is image information for generating images which the output apparatus 150 of the present embodiment presents, the acquisition apparatus 120 acquires three-dimensional image information that is necessary to generate three-dimensional images from a free perspective (a free perspective at least from an area around a batter's box). Since a "base point in time" corresponding to a ball release point in time and a ball speed can be detected from the image information acquired by the acquisition apparatus 120 of the present embodiment, the acquisition apparatus 120 may acquire only the above-described three-dimensional image information.

<Data Acquisition Processing at the Time of Pitch Data Acquisition>

Next, data acquisition processing which is performed at the time of pitch data acquisition will be described. The data acquisition processing which is performed at the time of pitch data acquisition is processing by which images and the like, which are presented by the output apparatus 150 at the time of batting data acquisition, are acquired. The data acquisition apparatus 110 executes each of the following processing, which is performed at the time of pitch data acquisition, under the control of the control unit 117.
<<Setting of a Difficulty Factor at the Time of Pitch Data Acquisition (Step S301)>>

The difficulty factor manipulation unit 111 selects a specific difficulty factor (for example, any one of the difficulty factors 1a, 1b, 2a, and 2b of FIG. 3) and outputs information indicating the selected difficulty factor. The information indicating the difficulty factor is transmitted to the output unit 112 and the data processing unit 115. In the present embodiment, it does not matter whether the condition is the known condition or the unknown condition at the time of pitch data acquisition; therefore, for example, when an evaluation of the performance of the first to third specific examples described in the first embodiment is needed, it is only necessary to determine in advance the pitch order of two pitch types, a fastball and a slowball, and select a pitch type in accordance with the pitch order determined in advance.
<<Output Processing at the Time of Pitch Data Acquisition (Step S302)>>

The output unit 112 transmits, to the output apparatus 140, information for providing a pitcher 11 with an instruction in accordance with the information indicating the difficulty factor, which was transmitted thereto. The output apparatus 140 presents the information transmitted thereto to the pitcher 11. For example, the output apparatus 140 provides the pitcher 11 with an instruction to throw a fastball next.
<<Detection Processing at the Time of Pitch Data Acquisition (Step S303)>>

The pitcher 11 makes a pitch of a pitch type in accordance with the instruction presented by the output apparatus 140. The data and three-dimensional images of the pitch action of the pitcher 11 or the movement of the ball are acquired by the acquisition apparatus 120 and transmitted to the detection unit 113. The detection unit 113 detects a "base point in time" corresponding to a ball release point in time and a ball speed based on the data or three-dimensional images transmitted thereto and transmits, to the data processing unit 115, information, which is correlated with the three-dimensional images, that identifies the "base point in time" and the ball speed.

<<Data Processing at the Time of Pitch Data Acquisition (Step S304)>>

The information indicating the difficulty factor, which was transmitted in Step S301, and the information, which was transmitted in Step S303, that identifies the "base point in time", the ball speed and the three-dimensional images are input to the data processing unit 115. The data processing unit 115 stores, in the storage 116, pitch data that is data obtained by correlating these pieces of information with each other.

<Data Acquisition Processing at the Time of Batting Data Acquisition>

Next, data acquisition processing which is performed at the time of batting data acquisition will be described. In the data acquisition processing which is performed at the time of batting data acquisition, with the aim of evaluating the motion performance of the batter 12, the data acquisition apparatus 110 acquires the motion data of the batter 12 by manipulating the difficulty factor of batting which is performed by the batter 12. The data acquisition apparatus 110 (FIG. 1) acquires motion data based on batting which is performed in a VR environment. Batting which is performed in a VR environment means wearing a head-mounted display and performing a motion of actually hitting a virtual ball thrown by a VR pitcher under a virtual environment. The data acquisition apparatus 110 executes each of the following processing, which is performed at the time of batting data acquisition, under the control of the control unit 117.

<<Setting of a Difficulty Factor at the Time of Batting Data Acquisition (Step S321)>>

Setting of a difficulty factor at the time of batting data acquisition is the same as setting of a difficulty factor at the time of data acquisition of the second embodiment.

<<Output Processing at the Time of Batting Data Acquisition (Step S322)>>

In accordance with the information indicating the difficulty factor, which was transmitted thereto, when there is information that is presented to the batter 12, the output unit 112 transmits the information to the output apparatus 150 and transmits the pitch data stored in the storage 116 to the output apparatus 150. The output apparatus 150 presents the information transmitted thereto to the batter 12. For example, when the information indicating the difficulty factor 2a was transmitted, the output unit 112 transmits, to the output apparatus 150, information to the effect that a fastball is thrown next and transmits the pitch data of a fastball stored in the storage 116 to the output apparatus 150. In this case, the output apparatus 150 presents, to the batter 12, information to the effect that a fastball is thrown next, and then presents images of a pitcher who is throwing a fastball and images of the ball thrown by the pitcher. For example, when the information indicating the difficulty factor 2b was transmitted, the output unit 112 transmits, to the output apparatus 150, information to the effect that a slowball is thrown next. In this case, the output apparatus 150 presents, to the batter 12, information to the effect that a slowball is thrown next, and then presents images of a pitcher who is throwing a slowball and images of the ball thrown by the pitcher. For example, when the information indicating the difficulty factor 1a was transmitted, the output unit 112 does not transmit, to the output apparatus 150, information on the pitch type of a ball which is thrown next. In this case, the output apparatus 150 does not present information on the next pitch type to the batter 12 and presents images of a pitcher who is throwing a fastball and images of the ball thrown by the pitcher. For example, when the information indicating the difficulty factor 1b was transmitted, the output unit 112 does not transmit, to the output apparatus 150, information on the pitch type of a ball which is thrown next. In this case, the output apparatus 150 does not present, to the batter 12, information on the next pitch type and presents images of a pitcher who is throwing a slowball and images of the ball thrown by the pitcher.

<<Motion Data Acquisition Processing at the Time of Batting Data Acquisition (Step S323)>>

The batter 12 makes a batting action in response to the VR ball presented in Step S322. The acquisition apparatus 130 acquires the motion data of the batter 12 associated with this batting action. The motion data is acquired by processing similar to the motion data acquisition processing of the second embodiment.

<<Data Processing at the Time of Batting Data Acquisition (Step S324)>>

The information indicating the difficulty factor, which was transmitted in Step S321, the information, which is stored in the storage 116, that identifies the "base point in time" and the ball speed, and the time-series motion data transmitted in Step S323 are input to the data processing unit 115. The data processing unit 115 stores, in the storage 116, a record made up of the difficulty factor, the base point in time, the ball speed, and the motion data which are indicated by these pieces of information and motion data and correlated with one another.

Fourth Embodiment

Next, a fourth embodiment will be described. The present embodiment is a modification of the first embodiment and evaluates the motion performance of a batter based on a difference in the position of a ball at the point in time when a batting motion was made. The following description mainly deals with a difference from the first embodiment and, for matters common to the first embodiment and the fourth embodiment, the same reference characters are used and explanations are simplified.

<Configuration>

In the present embodiment, the performance evaluation apparatus 160 is replaced by a performance evaluation apparatus 260.

<<Performance Evaluation Apparatus 260>>

As illustrated in FIG. 2, the performance evaluation apparatus 260 includes a storage 166, a data selection unit 167, a difference detection unit 268, a performance evaluation unit 269, and a control unit 165.

<Performance Evaluation Processing>

Performance evaluation processing which is performed by the performance evaluation apparatus 260 is processing by which, based on the motion data of a motion of an animal that is a subject for evaluation, which was obtained by manipulating the difficulty factor of the motion of the animal, the motion performance of the animal is evaluated. In the above-described examples of a batter's motion performance evaluation, in the performance evaluation processing, based on the motion data of a batter obtained by manipulating the difficulty factor in the above-described manner, the motion performance of the batter is evaluated.

In the first embodiment, the motion performance of a batter 12 is evaluated based on a difference in a relative time of a swing start; in the fourth embodiment, the motion performance of the batter 12 is evaluated based on a difference in the position of a ball at a relative time of a swing start. The performance evaluation apparatus 260 executes each of the following processing in accordance with control by the control unit 165.

<<Data Selection Processing (Step S167)>>

This processing is the same as the processing in the first embodiment.

<<Difference Detection Processing (Step S268)>>

In the fourth embodiment, in place of Step S168, the following processing is performed. The difference detection unit 268 obtains, using the motion data of the records corresponding to the "one set of different difficulty factors" transmitted thereto, evaluation information E for evaluating the motion performance of the batter 12 and outputs the evaluation information E. It is to be noted that the difference detection unit 268 obtains the evaluation information E based on the position of a ball at a relative time of a swing start.

For instance, when one tuple of records corresponding to the set (1) of the difficulty factors 1a and 1b was transmitted, the difference detection unit 268 obtains, using these records, the relative time t11 of a swing start of the motion data X11 corresponding to the difficulty factor 1a and the relative time t12 of a swing start of the motion data X12 corresponding to the difficulty factor 1b. Moreover, the difference detection unit 268 obtains a position p11 of a ball at the relative time t11 from the relative time t11 and the base point in time and the ball speed which are contained in the record corresponding to the relative time t11. Likewise, the difference detection unit 268 obtains a position p12 of a ball at the relative time t12 from the point in time t12 and the base point in time and the ball speed which are contained in the record corresponding to the point in time t12. Furthermore, the difference detection unit 268 calculates a distance P1=d(p11, p12) between these positions. Moreover, the difference detection unit 268 obtains, using the ball speeds contained in one tuple of records, a distance $P_{fc}$ between a position $p_c$, at which a slowball corresponding to the difficulty factor 1b arrives after a lapse of the time $t_f$ after a ball release, and a predetermined position on a home base. Here, the time $t_f$ is the time from a ball release of a fastball corresponding to the difficulty factor 1a to arrival thereof at the predetermined position on the home base. In addition, the difference detection unit 268 calculates a difference $|P1-P_{fc}|$ and outputs the difference $|P1-P_{fc}|$ as the evaluation information E. For instance, when two or more tuples of records (that is, three or more records) corresponding to the set (1) of the difficulty factors 1a and 1b were transmitted, the difference detection unit 268 may obtain the difference $|P1-P_{fc}|$ for each of the tuples of records corresponding to the set (1) of the difficulty factors 1a and 1b and output a plurality of differences $|P1-P_{fc}|$ thus obtained as the evaluation information E. Alternatively, the difference detection unit 268 may output, as the evaluation information E, the mean value of the differences $|P1-P_{fc}|$ obtained for the tuples of records corresponding to the set (1) of the difficulty factors 1a and 1b. For instance, when one tuple of records corresponding to the set (2) of the difficulty factors 1a and 2a was transmitted, the difference detection unit 268 obtains, using these records, the relative time t21 of a swing start of the motion data X21 corresponding to the difficulty factor 1a and the relative time t22 of a swing start of the motion data X22 corresponding to the difficulty factor 2a. Moreover, the difference detection unit 268 obtains a position p21 of a ball at the relative time t21 from the relative time t21 and the base point in time and the ball speed which are contained in the record corresponding to the relative time t21. Likewise, the difference detection unit 268 obtains a position p22 of a ball at the relative time t22 from the relative time t22 and the base point in time and the ball speed which are contained in the record corresponding to the relative time t22. Furthermore, the difference detection unit 268 calculates a distance P2=d(p21, p22) between these positions and outputs the distance P2 as the evaluation information E. For example, when two or more tuples of records corresponding to the set (2) of the difficulty factors 1a and 2a were transmitted, the difference detection unit 268 may obtain the distance P2 for each of the tuples of records corresponding to the set (2) of the difficulty factors 1a and 2a and output a plurality of distances P2 thus obtained as the evaluation information E. Alternatively, the difference detection unit 268 may output, as the evaluation information E, the mean value of the distances P2 obtained for the tuples of records corresponding to the set (2) of the difficulty factors 1a and 2a.

For example, when one tuple of records corresponding to the set (3) of the difficulty factors 1b and 2b was transmitted, the difference detection unit 268 obtains, using these records, the relative time t31 of a swing start of the motion data X31 corresponding to the difficulty factor 2b and the relative time t32 of a swing start of the motion data X32 corresponding to the difficulty factor 1b. Moreover, the difference detection unit 268 obtains a position p31 of a ball at the relative time t31 from the relative time t31 and the base point in time and the ball speed which are contained in the record corresponding to the relative time t31. Likewise, the difference detection unit 268 obtains a position p32 of a ball at the relative time t32 from the relative time t32 and the base point in time and the ball speed which are contained in the record corresponding to the relative time t32. Furthermore, the difference detection unit 268 calculates a distance P3=d(p31, p32) between these positions and outputs the distance P3 as the evaluation information E. For instance, when two or more tuples of records corresponding to the set (3) of the difficulty factors 1b and 2b were transmitted, the difference detection unit 268 may obtain the distance P3 for each of the tuples of records corresponding to the set (3) of the difficulty factors 1b and 2b and output a plurality of distances P3 thus obtained as the evaluation information E. Alternatively, the difference detection unit 268 may output, as the evaluation information E, the mean value of the distances P3 obtained for the tuples of records corresponding to the set (3) of the difficulty factors 1b and 2b.

Moreover, for instance, when one tuple of records corresponding to the set (3) of the difficulty factors 1b and 2b was transmitted, the difference detection unit 268 may also obtain, using these records, the maximum value v31 of a rotational speed of the motion data X31 corresponding to the difficulty factor 2b and the maximum value v32 of a rotational speed of the motion data X32 corresponding to the difficulty factor 1b. In this case, the difference detection unit 268 also calculates the difference vD3=|v31-v32| between the maximum value v31 of a rotational speed and the maximum value v32 of a rotational speed and outputs the evaluation information E containing the difference vD3. In this case, for example, the difference detection unit 268 may obtain the distance P3 and the difference vD3 in the maximum value of a rotational speed for each of the tuples of records corresponding to the set (3) of the difficulty factors 1b and 2b and output, as the evaluation information E, a plurality of distances P3 thus obtained and a plurality of differences vD3 thus obtained. Alternatively, the difference detection unit 268 may output, as the evaluation information E, the mean value of the distances P3 obtained for the tuples of records corresponding to the set (3) of the difficulty factors 1b and 2b and the mean value of the differences vD3 in the maximum value of a rotational speed obtained for the tuples of records corresponding to the set (3) of the difficulty factors 1b and 2b.

The evaluation information E is input to the performance evaluation unit 269. The processing which is performed after this input is the same as the processing in the first embodiment.

Fifth Embodiment

Next, a fifth embodiment will be described. The present embodiment is a modification of the second embodiment, and a pitching apparatus (a pitching machine) makes a pitch in place of a pitcher 11.
<Configuration>
<<Data Acquisition Apparatus 310>>

Figure 7:
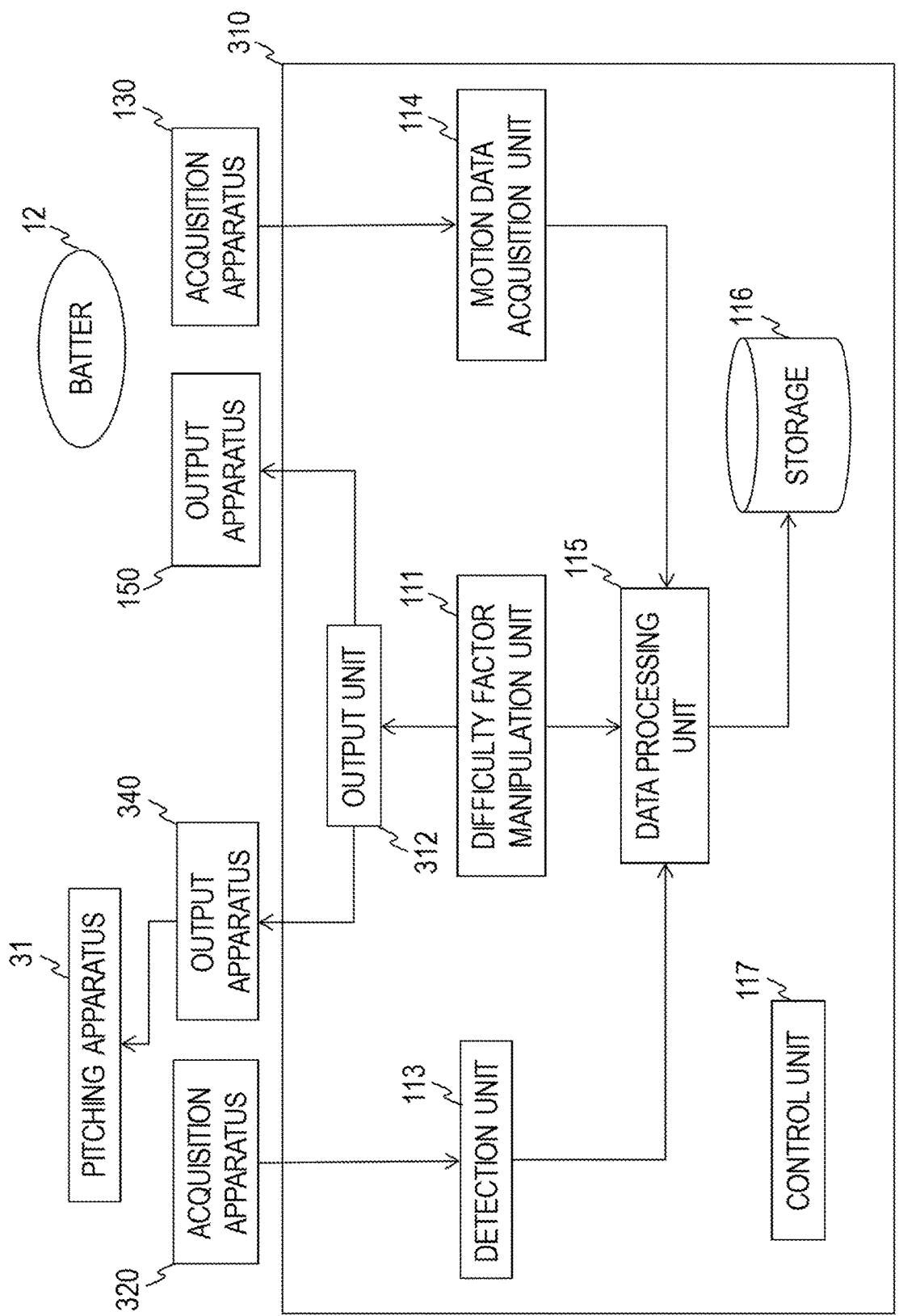
FIG. 7 is a block diagram for illustrating the functional configuration of a data acquisition apparatus of an embodiment.

As illustrated in FIG. 7, a data acquisition apparatus 310 of the present embodiment includes a difficulty factor manipulation unit 111, an output unit 312, a detection unit 113, a motion data acquisition unit 114, a data processing unit 115, a storage 116, and a control unit 117. The detection unit 113 is connected to an acquisition apparatus 320, the motion data acquisition unit 114 is connected to an acquisition apparatus 130, the output unit 312 is connected to output apparatuses 340 and 150, and the output apparatus 340 is connected to a pitching apparatus 31.
<<Acquisition Apparatus 320>>

The acquisition apparatus 320 is an apparatus that acquires data for detecting a "base point in time" corresponding to a ball release point in time of the pitching apparatus 31 and a ball speed. An example of the acquisition apparatus 320 is a sensor (for example, an acceleration sensor, a speed sensor, a gyroscope sensor, a magnetic sensor, or the like) that is attached to the pitching apparatus 31 or a ball and detects the movement of the acquisition apparatus 320 or the movement of the ball. Another example of the acquisition apparatus 320 is a camera that acquires images for acquiring positional information of the pitching apparatus 31 or the ball by motion capture or the like. Moreover, a high-speed camera may be used as the acquisition apparatus 320. In addition to those described above, a camera or sensor for acquiring the movement of the pitching apparatus 31 or positional information of the ball by using an existing technique such as Kinect may be used as the acquisition apparatus 320.
<<Output Apparatus 340>>

The output apparatus 340 is an apparatus that provides the pitching apparatus 31 with an instruction in accordance with a difficulty factor. For example, the output apparatus 340 provides the pitching apparatus 31 with an instruction on, for example, the pitch type of a ball (for instance, a straight ball (a fastball) or a change-up (a slowball)) which the pitching apparatus 31 throws next.
<<Pitching Apparatus 31>>

The pitching apparatus 31 is an apparatus that pitches a ball of a pitch type in accordance with the instruction from the output apparatus 340.
<Data Acquisition Processing>

In data acquisition processing of the present embodiment, the pitching apparatus 31 makes a pitch in place of the pitcher 11.

<<Setting of a Difficulty Factor (Step S111)>>

This processing is the same as the processing in the second embodiment.
<<Output Processing (Step S312)>>

In the present embodiment, in place of Step S112, Step S312 is executed. In Step S312, the output unit 312 transmits, to the output apparatus 340, information for providing the pitching apparatus 31 with an instruction on a pitch type in accordance with the information indicating the difficulty factor, which was transmitted thereto. Moreover, when there is information that is presented to a batter 12, the output unit 312 transmits the information to the output apparatus 150. The information which is transmitted to the output apparatus 150 is the same as the information which is transmitted in the second embodiment. The output apparatus 340 transmits the information transmitted thereto to the pitching apparatus 31. For example, when the information indicating the difficulty factor 1a was transmitted, the output unit 312 transmits, to the output apparatus 340, information to the effect that the pitching apparatus 31 throws a fastball next, but does not transmit, to the output apparatus 150, information on the pitch type of a ball which is thrown next. In this case, the output apparatus 340 provides the pitching apparatus 31 with an instruction to throw a fastball next, but the output apparatus 150 does not present, to the batter 12, information on the next pitch type. For example, when the information indicating the difficulty factor 1b was transmitted, the output unit 312 transmits, to the output apparatus 340, information to the effect that the pitching apparatus 31 throws a slowball next, but does not transmit, to the output apparatus 150, information on the pitch type of a ball which is thrown next. In this case, the output apparatus 340 provides the pitching apparatus 31 with an instruction to throw a slowball next, but the output apparatus 150 does not present, to the batter 12, information on the next pitch type.
<<Detection Processing (Step S113)>>

This processing is the same as the processing in the second embodiment except that, in place of the pitcher 11, the pitching apparatus 31 makes a pitch of a pitch type (a fastball or a slowball) in accordance with the instruction from the output apparatus 340.
<<Motion Data Acquisition Processing (Step S114)>>

This processing is the same as the processing in the second embodiment except that the batter 12 bats a ball thrown by the pitching apparatus 31 in place of the pitcher 11.
<<Data Processing (Step S115)>>

This processing is the same as the processing in the second embodiment. The data acquisition apparatus 310 repeats the processing in Steps S111, S312, and S113 to S115 more than once under the control of the control unit 117. The data acquisition apparatus 310 acquires the motion data of the batter 12 by manipulating the difficulty factor in this way and stores, in the storage 116, a table made up of records, each being made up of a difficulty factor, a base point in time, a ball speed, and motion data which are correlated with one another.

[Other Modifications and so Forth]

It is to be noted that the present invention is not limited to the above-described embodiments. For example, in the above-described embodiments, the data acquisition apparatus and the performance evaluation apparatus are different apparatuses; the data acquisition apparatus and the performance evaluation apparatus may be integrated into a single apparatus. Alternatively, part of the processing which is executed by the above-described data acquisition apparatus may be executed by the performance evaluation apparatus or part of the processing which is executed by the above-described performance evaluation apparatus may be executed by the data acquisition apparatus. Moreover, the acquisition apparatuses 120 and 130 may be replaced by one apparatus or the acquisition apparatuses 320 and 130 may be replaced by one apparatus. In the above-described embodiments, a table made up of records, each being made up of a difficulty factor, a base point in time, a ball speed, and motion data which are correlated with one another, is stored in the storage 116; a table made up of records obtained from a difficulty factor, a base point in time, a ball speed, and motion data may be stored in the storage 116. For example, in place of motion data and a base point in time, motion data whose time is a relative time relative to a base point in time may be used as an element of a record.

The above-described various kinds of processing may be executed, in addition to being executed in chronological order in accordance with the descriptions, in parallel or individually depending on the processing power of an apparatus that executes the processing or when necessary. In addition, it goes without saying that changes may be made as appropriate without departing from the spirit of the present invention.

The above-described data acquisition apparatus and performance evaluation apparatus are embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements the functional configuration by loading of programs like a CPU. An electronic circuit constituting a single apparatus may include multiple CPUs.

When the above-described configurations are implemented by a computer, the processing details of the functions supposed to be provided in each apparatus are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage unit of a server computer and transferring the program to other computers from the server computer via a network.

The computer that executes such a program first, for example, temporarily stores the program recorded on the portable recording medium or the program transferred from the server computer in a storage unit thereof. At the time of execution of processing, the computer reads the program stored in the storage unit thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

Instead of executing a predetermined program on the computer to implement the processing functions of the present apparatuses, at least some of the processing functions may be implemented by hardware.

DESCRIPTION OF REFERENCE NUMERALS 110, 310 data acquisition apparatus
160, 260 performance evaluation apparatus

What is claimed is:
1. A performance evaluation apparatus comprising processing circuitry configured to:
retrieve a first set of time lapse data subsequent to transmitting a first instruction to pitch a ball according to a first difficulty factor, wherein the first set of time lapse data indicates motions of batting and a thrown ball captured by a sensor;
retrieve a second set of time lapse data subsequent to transmitting a second instruction to pitch another ball according to a second difficulty factor, wherein the second set of time lapse data indicates motions of batting and a thrown other ball captured by the sensor, and the first instruction and the second instruction are distinct according to the first and second difficulty factors;
evaluate, based on the retrieved first and second sets of time lapse data according to the first and second difficulty factors, that the smaller a difference between a first difference and a second difference according to a predetermined threshold of time, a higher motion performance of a batter, wherein the higher motion performance of the batter represents a higher degree of ability of the batter in hitting a ball with accuracy,
wherein
the first difference is a difference between a first elapsed time and a second elapsed time,
the second difference is a difference between a third elapsed time and a fourth elapsed time,
the first elapsed time is an elapsed time in the first set of time lapse data from a time at which a fastball was pitched to a predetermined event in a batting action made by the batter in response to the fastball where the first elapsed time was acquired under a condition where balls of a plurality of pitch types are randomly thrown without informing the batter of a pitch type,
the second elapsed time is an elapsed time in the second set of time lapse data from a point in time when a slow ball was pitched to the predetermined event in a batting action made by the batter in response to the slowball where the second elapsed time was acquired under a condition where balls of a plurality of pitch types are randomly thrown without informing the batter of a pitch type, the third elapsed time is an elapsed time from a point in time in the first set of time lapse data when the fastball was pitched to a point in time when the fastball arrives at a predetermined position near a batter's box, and the fourth elapsed time is an elapsed time from a point in time in the second set of time lapse data when the slowball was pitched to a point in time when the slowball arrives at the predetermined position near the batter's box; and transmit the evaluated motion performance of the batter to an application configured to output the evaluated motion performance of the batter as an evaluation result.

2. A performance evaluation apparatus comprising processing circuitry configured to:

retrieve a first set of time lapse data subsequent to transmitting a first instruction to pitch a ball according to a first difficulty factor, wherein the first set of time lapse data indicates motions of batting and a thrown ball captured by a sensor;

retrieve a second set of time lapse data subsequent to transmitting a second instruction to pitch another ball according to a second difficulty factor, wherein the second set of time lapse data indicates motions of batting and a thrown other ball captured by the sensor, and the first instruction and the second instruction are distinct according to the first and second difficulty factors;

evaluate, based on the retrieved first and second sets of time lapse data according to the first and second difficulty factors, that the smaller a difference between a first elapsed time and a second elapsed time according to a predetermined threshold of time, a higher motion performance of a batter, wherein the higher motion performance of the batter represents a higher degree of ability of the batter in hitting a ball with accuracy, wherein the first elapsed time is an elapsed time in the first set of time lapse data from a time at which a fastball was pitched to a swing start of the batter in response to the fastball where the first elapsed time was acquired under a condition where balls of a plurality of pitch types are randomly thrown without informing the batter of a pitch type, and the second lapsed time is an elapsed time in the second set of time lapse data from a time at which the fastball was pitched to a swing start of the batter where the second elapsed time was acquired under a condition where the fastball is thrown to the batter who is informed that a ball to be thrown is the fastball; and transmit the evaluated motion performance of the batter to an application configured to output the evaluated motion performance of the batter as an evaluation result.

3. A performance evaluation apparatus comprising processing circuitry configured to:

retrieve a first set of time lapse data subsequent to transmitting a first instruction to pitch a ball according to a first difficulty factor, wherein the first set of time lapse data indicates motions of batting and a thrown ball captured by a sensor;

retrieve a second set of time lapse data subsequent to transmitting a second instruction to pitch another ball according to a second difficulty factor, wherein the second set of time lapse data indicates motions of batting and a thrown other ball captured by the sensor, and the first instruction and the second instruction are distinct according to the first and second difficulty factors; and evaluate, based on the retrieved first and second sets of time lapse data according to the first and second difficulty factors, a type of a method to handle a slow ball as motion performance of a batter based on a magnitude of a difference between a first elapsed time and a second elapsed time according to a predetermined threshold of time, wherein the first elapsed time is an elapsed time in the first set of time lapse data from a time at which a first slow ball was pitched to a swing start of the batter in response to the first slow ball where the first elapsed time was acquired under a condition where balls of a plurality of pitch types are randomly thrown without informing the batter of a pitch type, and the second lapsed time is an elapsed time in the second set of time lapse data from a time at which a second slowball was pitched to a swing start of the batter where the second elapsed time was acquired under a condition where the second slow ball is thrown to the batter who is informed that a ball to be thrown is the second slow ball; and transmit the evaluated motion performance of the batter to an application configured to output the evaluated motion performance of the batter as an evaluation result.

4. A performance evaluation method comprising:

a step of retrieving a first set of time lapse data subsequent to transmitting a first instruction to pitch a ball according to a first difficulty factor, wherein the first set of time lapse data indicates motions of batting and a thrown ball captured by a sensor;

a step of retrieving a second set of time lapse data subsequent to transmitting a second instruction to pitch another ball according to a second difficulty factor, wherein the second set of time lapse data indicates motions of batting and a thrown other ball captured using the sensor, and the first instruction and the second instruction are distinct according to the first and second difficulty factors; and a step of evaluating, based on the retrieved first and second sets of time lapse data according to the first and second difficulty factors, that the smaller a difference between a first difference and a second difference according to a predetermined threshold of time, a higher motion performance of a batter, wherein the higher motion performance of the batter represents a higher degree of ability of the batter in hitting a ball with accuracy, wherein the first difference is a difference between a first elapsed time and a second elapsed time, the second difference is a difference between a third elapsed time and a fourth elapsed time, the first elapsed time is an elapsed time in the first set of time lapse data from a time at which a fastball was pitched to a predetermined event in a batting action made by the batter in response to the fastball where the first elapsed time was acquired under a condition where balls of a plurality of pitch types are randomly thrown without informing the batter of a pitch type, the second elapsed time is an elapsed time in the second set of time lapse data from a point in time when a slowball was pitched to the predetermined event in a batting action made by the batter in response to the slowball where the second elapsed time was acquired under a condition where balls of a plurality of pitch types are randomly thrown without informing the batter of a pitch type, the third elapsed time is an elapsed time in the first set of time lapse data from a point in time when the fastball was pitched to a point in time when the fastball arrives at a predetermined position near a batter's box, and the fourth elapsed time is an elapsed time in the second set of time lapse data from a point in time when the slowball was pitched to a point in time when the slowball arrives at the predetermined position near the better's box; and a step of transmitting the evaluated motion performance of the batter to an application configured to output the evaluated motion performance of the batter as an evaluation result.

5. A performance evaluation method comprising:

a step of retrieving a first set of time lapse data subsequent to transmitting a first instruction to pitch a ball according to a first difficulty factor, wherein the first set of time lapse data indicates motions of batting and a thrown ball captured by a sensor;

a step of retrieving a second set of time lapse data subsequent to transmitting a second instruction to pitch another ball according to a second difficulty factor, wherein the second set of time lapse data indicates motions of batting and a thrown other ball captured using the sensor, and the first instruction and the second instruction are distinct according to the first and second difficulty factors;

a step of evaluating, based on the retrieved first and second sets of time lapse data according to the first and second difficulty factors, the smaller a difference between a first elapsed time and a second elapsed time according to a predetermined threshold of time, a higher motion performance of a batter, wherein the higher motion performance of the batter represents a higher degree of ability of the batter in hitting a ball with accuracy, wherein the first elapsed time is an elapsed time in the first set of time lapse data from a time at which a fastball was pitched to a swing start of the batter in response to the fastball where the first elapsed time was acquired under a condition where balls of a plurality of pitch types are randomly thrown without informing the batter of a pitch type, and the second elapsed time is an elapsed time in the second set of time lapse data from a time at which the fastball was pitched to a swing start of the batter where the second elapsed time was acquired under a condition where a fastball is thrown to the batter who is informed that a ball to be thrown is a fastball; and a step of transmitting the evaluated motion performance of the batter to an application configured to output the evaluated motion performance of the batter as an evaluation result.

6. A performance evaluation method comprising:

a step of retrieving a first set of time lapse data subsequent to transmitting a first instruction to pitch a ball according to a first difficulty factor, wherein the first set of time lapse data indicates motions of batting and a thrown ball captured by a sensor;

a step of retrieving a second set of time lapse data subsequent to transmitting a second instruction to pitch another ball according to a second difficulty factor, wherein the second set of time lapse data indicate motions of batting and a thrown other ball captured by the sensor, and the first instruction and the second instruction are distinct according to the first and second difficulty factors; and a step of evaluating, based on the retrieved first and second sets of time lapse data according to the first and second difficulty factors, a type of a method to handle a slow ball as motion performance of a batter based on a magnitude of a difference between a first elapsed time and a second elapsed time according to a predetermined threshold of time, wherein the first elapsed time is an elapsed time in the first set of time lapse data from a time at which a first slow ball was pitched to a swing start of the batter in response to the first slow ball where the first elapsed time was acquired under a condition where balls of a plurality of pitch types are randomly thrown without informing the batter of a pitch type, and the second elapsed time is an elapsed time in the second set of time lapse data from a time at which a second slowball was pitched to a swing start of the batter where the second elapsed time was acquired under a condition where the second slow ball is thrown to the batter who is informed that a ball to be thrown is the second slow ball; and a step of transmitting the evaluated motion performance of the batter to an application configured to output the evaluated motion performance of the batter as an evaluation result.

7. A non-transitory computer-readable recording medium storing a program for making a computer function as a performance evaluation apparatus comprising processing circuitry configured to:

retrieve a first set of time lapse data subsequent to transmitting a first instruction to pitch a ball according to a first difficulty factor, wherein the first set of time lapse data indicates motions of batting and a thrown ball captured by a sensor;

retrieve a second set of time lapse data subsequent to transmitting a second instruction to pitch another ball according to a second difficulty factor, wherein the second set of time lapse data indicates motions of batting and a thrown other ball captured by the sensor, and the first instruction and the second instruction are distinct according to the first and second difficulty factors;

evaluate, based on the retrieved first and second sets of time lapse data according to the first and second difficulty factors, the smaller a difference between a first difference and a second difference according to a predetermined threshold of time, a higher motion performance of a batter, wherein the higher motion performance of the batter represents a higher degree of ability of the batter in hitting a ball with accuracy, wherein the first difference is a difference between a first elapsed time and a second elapsed time, the second difference is a difference between a third elapsed time and a fourth elapsed time, the first elapsed time is an elapsed time in the first set of time lapse data from a time at which a fastball was pitched to a predetermined event in a batting action made by the batter in response to the fastball where the first elapsed time was acquired under a condition where balls of a plurality of pitch types are randomly thrown without informing the batter of a pitch type, the second elapsed time is an elapsed time in the second set of time lapse data from a point in time when a slowball was pitched to the predetermined event in a batting action made by the batter in response to the slowball where the second elapsed time was acquired under a condition where balls of a plurality of pitch types are randomly thrown without informing the batter of a pitch type, the third elapsed time is an elapsed time in the first set of time lapse data from a point in time when the fastball was pitched to a point in time when the fastball arrives at a predetermined position near a batter's box, and the fourth elapsed time is an elapsed time in the second set of time lapse data from a point in time when the slowball was pitched to a point in time when the slow ball arrives at the predetermined position near the batter's box; and transmit the evaluated motion performance of the batter to an application configured to output the evaluated motion performance of the batter as an evaluation result.

8. A non-transitory computer-readable recording medium storing a program for making a computer function as a performance evaluation apparatus comprising processing circuitry configured to:

retrieve a first set of time lapse data subsequent to transmitting a first instruction to pitch a ball according to a first difficulty factor, wherein the first set of time lapse data indicates motions of batting and a thrown ball captured by a sensor;

retrieve a second set of time lapse data subsequent to transmitting a second instruction to pitch another ball according to a second difficulty factor, wherein the second set of time lapse data indicates motions of batting and a thrown other ball captured by the sensor, and the first instruction and the second instruction are distinct according to the first and second difficulty factors; and evaluate, based on the retrieved first and second sets of time lapse data according to the first and second difficulty factors, that the smaller a difference between a first elapsed time and a second elapsed time according to a predetermined threshold of time, a higher motion performance of a batter, wherein the higher motion performance of the batter represents a higher degree of ability of the batter in hitting a ball with accuracy, wherein the first elapsed time is an elapsed time in the first set of time lapse data from a time at which a fastball was pitched to a swing start of the batter in response to the fastball where the first elapsed time was acquired under a condition where balls of a plurality of pitch types are randomly thrown without informing the batter of a pitch type, and the second elapsed time is an elapsed time in the second set of time lapse data from a time at which the fastball was pitched to a swing start of the batter where the second elapsed time was acquired under a condition where a fastball is thrown to the batter who is informed that a ball to be thrown is a fastball; and transmit the evaluated motion performance of the batter to an application configured to output the evaluated motion performance of the batter as an evaluation result.

9. A non-transitory computer-readable recording medium storing a program for making a computer function as a performance evaluation apparatus comprising processing circuitry configured to retrieve a first set of time lapse data subsequent to transmitting a first instruction to pitch a ball according to a first difficulty factor, wherein the first set of time lapse data indicates motions of batting and a thrown ball captured by a sensor;

retrieve a second set of time lapse data subsequent to transmitting a second instruction to pitch another ball according to a second difficulty factor, wherein the second set of time lapse data indicates motions of batting and a thrown other ball captured by the sensor, and the first instruction and the second instruction are distinct according to the first and second difficulty factors;

evaluate, based on the retrieved first and second sets of time lapse data according to the first and second difficulty factors, a type of a method to handle a slowball as motion performance of a batter based on a magnitude of a difference between a first elapsed time and a second elapsed time according to a predetermined threshold of time, wherein the first elapsed time is an elapsed time in the first set of time lapse data from a time at which a first slowball was pitched to a swing start of the batter in response to the first slowball where the first elapsed time was acquired under a condition where balls of a plurality of pitch types are randomly thrown without informing the batter of a pitch type, and the second elapsed time is an elapsed time in the second set of time lapse data from a time at which a second slowball was pitched to a swing start of the batter where the second elapsed time was acquired under a condition where the second slowball is thrown to the batter who is informed that a ball to be thrown is the second slowball; and transmit the evaluated motion performance of the batter to an application configured to output the evaluated motion performance of the batter as an evaluation result.

* * * * *